United States Patent
Matsuzawa et al.

(10) Patent No.: US 10,210,035 B2
(45) Date of Patent: Feb. 19, 2019

(54) COMPUTER SYSTEM AND MEMORY DUMP METHOD

(71) Applicant: Hitachi, Ltd., Tokyo (JP)

(72) Inventors: Keiichi Matsuzawa, Tokyo (JP); Noboru Morishita, Tokyo (JP); Toshiomi Moriki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 174 days.

(21) Appl. No.: 15/506,295

(22) PCT Filed: Oct. 8, 2014

(86) PCT No.: PCT/JP2014/076909
§ 371 (c)(1),
(2) Date: Feb. 24, 2017

(87) PCT Pub. No.: WO2016/056074
PCT Pub. Date: Apr. 14, 2016

(65) Prior Publication Data
US 2017/0277587 A1    Sep. 28, 2017

(51) Int. Cl.
*G06F 11/00* (2006.01)
*G06F 11/07* (2006.01)
*G06F 9/46* (2006.01)

(52) U.S. Cl.
CPC ............ *G06F 11/0778* (2013.01); *G06F 9/46* (2013.01); *G06F 11/0712* (2013.01); *G06F 11/0784* (2013.01)

(58) Field of Classification Search
CPC .................................................. G06F 11/0778
USPC ........................................................ 714/45
See application file for complete search history.

(56) References Cited

U.S. PATENT DOCUMENTS

| 6,681,348 B1* | 1/2004 | Vachon | G06F 11/0778 714/38.11 |
| 2009/0254999 A1* | 10/2009 | Julin | G06F 11/0748 726/28 |
| 2014/0040671 A1* | 2/2014 | Akirav | G06F 11/1612 714/45 |

(Continued)

FOREIGN PATENT DOCUMENTS

WO    2012/137239 A1    10/2012

OTHER PUBLICATIONS

International Search Report of PCT/JP2014/076909 dated Dec. 16, 2014.

*Primary Examiner* — Christopher S McCarthy
(74) *Attorney, Agent, or Firm* — Mattingly & Malur, PC

(57) ABSTRACT

A computer system, having: a physical computer, which includes a processor and a memory; and an external apparatus, which is coupled to the physical computer and which includes a storage apparatus, the physical computer further includes: a virtualization module for providing at least one virtual machine; a first failure monitoring module for detecting a failure in the physical computer and the virtualization module; a first memory dump module for copying, to the external apparatus, a first area in the memory which is allocated to the virtualization module; a second failure monitoring module for detecting a failure in the virtual machine; and a second memory dump module for copying, to the external apparatus, a second area in the memory which is allocated by the virtualization module to the virtual machine.

15 Claims, 16 Drawing Sheets

(56) References Cited

U.S. PATENT DOCUMENTS

2014/0068341 A1    3/2014  Martineau et al.
2017/0277587 A1*  9/2017  Matsuzawa ............... G06F 9/46

* cited by examiner

| VIRTUAL MACHINE ID | OFFSET | SIZE |
|---|---|---|
| 0 | 0x40000000 | 0x40000000 |
| 1 | 0x80000000 | 0x20000000 |
| 2 | 0xA0000000 | 0x100000000 |

Fig. 4

| | 510 | 520 | 530 |
|---|---|---|---|
| | DATA STRUCTURE NAME | OFFSET | SIZE |
| 541 | PROCESS INFORMATION | 0x1000000 | 0x20000 |
| 542 | HARDWARE INFORMATION | 0x2000000 | 0x1000000 |
| 543 | I/O INFORMATION | 0x3000000 | 0x50000 |

| ID | DATA STRUCTURE | FAILURE CAUSE ||||| 
| | | CPU FAILURE | NIC FAILURE | INTERNAL COMMUNICATION ERROR | LOGICAL ERROR | TIME ERROR |
|---|---|---|---|---|---|---|
| HYPERVISOR | MAP MANAGEMENT TABLE | A | A | A | A | C |
| HYPERVISOR | OBTAINING AREA TABLE | A | A | A | A | C |
| HYPERVISOR | PROCESS INFORMATION | A | C | A | A | B |
| HYPERVISOR | HARDWARE INFORMATION | A | A | C | C | C |
| HYPERVISOR | I/O INFORMATION | B | A | C | C | C |
| HYPERVISOR | OPERATION LOG | A | A | A | A | A |
| VIRTUAL #0 | PROCESS INFORMATION | A | C | C | A | B |
| VIRTUAL #0 | VIRTUAL-HARDWARE INFORMATION | A | A | A | C | C |
| VIRTUAL #0 | I/O INFORMATION | B | A | A | C | C |
| VIRTUAL #1 | PROCESS INFORMATION | A | C | C | A | B |
| VIRTUAL #1 | VIRTUAL-HARDWARE INFORMATION | A | A | A | C | C |
| VIRTUAL #1 | I/O INFORMATION | B | A | A | C | C |
| SUSPENSION TARGET | | ALL | ALL | ALL | RELEVANT ID | NONE |
| VIRTUAL MEMORY TRANSMISSION INTERFACE | | INTERNAL | INTERNAL | OUTPUT | INTERNAL | OUTPUT |

*Fig. 6*

| ID | DATA STRUCTURE | FAILURE CAUSE | | | | |
|---|---|---|---|---|---|---|
| | | CPU FAILURE | SHARED MEMORY ERROR | INTERNAL COMMU-NICATION ERROR | LOGICAL ERROR | TIME ERROR |
| HYPERVISOR | MAP MANAGEMENT TABLE | A | A | A | A | C |
| HYPERVISOR | OBTAINING AREA TABLE | A | A | A | A | C |
| HYPERVISOR | PROCESS INFORMATION | A | C | A | A | B |
| HARDWARE MANAGEMENT | HARDWARE INFORMATION | A | A | C | C | C |
| HARDWARE MANAGEMENT | I/O INFORMATION | B | A | C | C | C |
| SHARED MEMORY | OPERATION LOG | A | A | A | A | A |
| VIRTUAL #0 | PROCESS INFORMATION | A | C | C | A | B |
| VIRTUAL #0 | VIRTUAL-HARDWARE INFORMATION | A | A | A | C | C |
| VIRTUAL #0 | I/O INFORMATION | B | A | A | C | C |
| VIRTUAL #1 | PROCESS INFORMATION | A | C | C | A | B |
| VIRTUAL #1 | VIRTUAL-HARDWARE INFORMATION | A | A | A | C | C |
| VIRTUAL #1 | I/O INFORMATION | B | A | A | C | C |
| SUSPENSION TARGET | | ALL | ALL | ALL | RELEVANT ID | NONE |
| VIRTUAL MEMORY TRANSMISSION INTERFACE | | INTERNAL | INTERNAL | OUTPUT | INTERNAL | OUTPUT |
| HYPERVISOR-USE AREA TRANSMISSION INTERFACE | | SHARED MEMORY | OUTPUT | SHARED MEMORY | SHARED MEMORY | SHARED MEMORY |

Fig. 10

| ID | DATA STRUCTURE | FAILURE CAUSE | | | |
|---|---|---|---|---|---|
| | | CPU FAILURE | SHARED MEMORY ERROR | LOGICAL ERROR | TIME ERROR |
| PHYSICAL MEMORY | OBTAINING AREA TABLE | A | A | A | C |
| PHYSICAL MEMORY | PROCESS INFORMATION | A | A | A | C |
| PHYSICAL MEMORY | HARDWARE INFORMATION | A | C | A | B |
| PHYSICAL MEMORY | I/O INFORMATION | A | A | C | C |
| PHYSICAL MEMORY | OPERATION LOG | B | A | C | C |
| DEDICATED MEMORY | PROCESS INFORMATION | A | A | A | A |
| DEDICATED MEMORY | HARDWARE INFORMATION | A | C | A | B |
| DEDICATED MEMORY | I/O INFORMATION | A | A | C | C |
| DEDICATED MEMORY | OPERATION LOG | B | A | C | C |
| SUSPENSION TARGET | | ALL | ALL | DEDICATED PROCESSING MODULE | NONE |
| DEDICATED MEMORY TRANSMISSION INTERFACE | | SHARED MEMORY | OUTPUT | SHARED MEMORY | SHARED MEMORY |

*Fig. 14*

COMPUTER SYSTEM AND MEMORY DUMP METHOD

BACKGROUND

This invention relates to a memory dump obtaining technology in a computer that has a virtualization environment or a logical resource partitioning environment.

Computer systems that run a plurality of virtual machines on a single physical computer are increasing in number with the spread of a virtual machine (VM) technology which uses a hypervisor and a logical partitioning (LPAR) technology which logically partitions resources.

Another factor that pushes the spread of the virtual machine (VM) or logical partitioning (LPAR) technology is an increase in the capacity of a memory included in a computer. The increased capacity of a memory installed in a single physical computer enables the physical computer to run a large number of virtual machines in a consolidated manner.

There is a demerit to the increase in the capacity of a memory installed in a physical computer. In one of methods of analyzing a computer failure, data that is in a memory at the time of the failure is copied to another computer or a storage medium for later analysis. The copied data in the memory is called a memory dump. When the capacity of an installed memory increases, a storage medium in which a memory dump is stored requires a larger capacity and the copying processing takes longer, thereby increasing the trouble of obtaining a memory dump.

It is therefore a common practice to narrow down areas for which memory dumping is performed. The area narrowing is a technology of reducing the capacity necessary for an obtained memory dump by, instead of copying every piece of data in the memory, obtaining memory dumps only for areas that store data highly relevant to the site of a failure.

A problem arises when existing methods are employed to execute the narrowing of areas for memory dumping on a computer that uses the VM or LPAR technology. Failures that occur in the computer are detected by different components depending on the type of failure, for example, a failure detected by VMs or logical partitions (LPARs) such as a logical discrepancy in VMs or LPARs, and a failure detected by a hypervisor such as a hardware defect or a failure in an inter-VM communication path.

In addition, different operating systems (OSes) generally run on a hypervisor and individual VMs or LPARs, and the placement of various types of data in the memory also differs from each other. Consequently, the placement of data of a hypervisor or data of a VM or an LPAR that is not a hypervisor or a VM or an LPAR that has detected a failure, is unknown, which means that areas of target for memory dumping cannot be narrowed down.

Methods of narrowing down areas for memory dumping in a computer environment that uses the VM or LPAR technology as this have been proposed in US 2014/0068341 A1 and WO 2012/137239 A1. In the method of US 2014/0068341 A1, when a failure is detected by a hypervisor, only the entirety of a memory area that is taken up by a VM or an LPAR that is relevant to the failure is set as a memory dump target.

In the method of WO 2012/137239 A1, when a failure occurs in a VM or an LPAR, memory dumping is executed for a memory area of the VM or of the LPAR and for an area relevant to the failure out of a memory area that is managed by a hypervisor.

SUMMARY

However, the technology of US 2014/0068341 A1 is not to further narrow down areas at a finer granularity from the memory area that is used by the VM or the LPAR, and accordingly has a problem in that the memory dump capacity that can be reduced with the technology is not large.

The technology of WO 2012/137239 A1 which is targeted for a failure that can be detected in a VM or an LPAR has a problem in that failure detection in a hypervisor is not covered by the technology.

A problem to be solved by this invention is that, when a failure is detected in one of a hypervisor and a VM/LPAR on a computer that runs a plurality of VMs or LPARs as well as a hypervisor, an enormous capacity is consumed by copied data because the contents of the memory that are copied include data irrelevant to the cause of the failure.

It is therefore an object of this invention to reduce the capacity of a storage medium in which a memory dump is stored and the time required to copy data in a memory.

A representative aspect of the present disclosure is as follows. A computer system, comprising: a physical computer, which comprises a processor and a memory; and an external apparatus, which is coupled to the physical computer and which comprises a storage apparatus, wherein the physical computer further comprises: a virtualization module for providing at least one virtual machine; a first failure monitoring module for detecting a failure in the physical computer and the virtualization module; a first memory dump module for copying, to the external apparatus, a first area in the memory which is allocated to the virtualization module; a second failure monitoring module for detecting a failure in the virtual machine; and a second memory dump module for copying, to the external apparatus, a second area in the memory which is allocated by the virtualization module to the virtual machine, wherein the virtualization module holds: obtaining area information in which a data structure for which memory dumping is to be executed is set for each cause of a failure expected to occur in the physical computer, the virtualization module, and the virtual machine; and first state management information for identifying a location in the first area of the data structure, wherein the virtual machine holds second state management information for identifying a location in the second area of the data structure, wherein, when a failure is detected by at least one of the first failure monitoring module or the second failure monitoring module, the first memory dump module obtains a cause of the failure from one of the first failure monitoring module and the second failure monitoring module that has detected the failure, refers to the obtaining area information to obtain a data structure that is associated with the obtained failure cause, refers to the first state management information to identify the first area that corresponds to the obtained data structure, copies the identified first area to the external apparatus, and notifies the obtained data structure to the second memory dump module, and wherein the second memory dump module refers to the second state management information to identify the second area that corresponds to the notified data structure, and copies the identified second area to the external apparatus.

According to one embodiment of this invention, the capacity of a storage medium in which a memory dump is stored and the time required to copy data in a memory are reduced by narrowing down memory areas for which memory dumps are obtained when a failure occurs.

BRIEF DESCRIPTION OF THE DRAWINGS

FIG. 4 shows an example of a map management table according to the first embodiment of this invention.

FIG. 5 shows an example of data placement information according to the first embodiment of this invention.

FIG. 6 shows an example of an obtaining area table according to the first embodiment of this invention.

FIG. 10 shows an example of the obtaining area table according to the second embodiment of this invention.

FIG. 14 shows an example of the obtaining area table according to the third embodiment of this invention.

DETAILED DESCRIPTION OF THE PREFERRED EMBODIMENTS

Embodiments of this invention are described below with reference to the accompanying drawings.

First Embodiment

Figure 1:
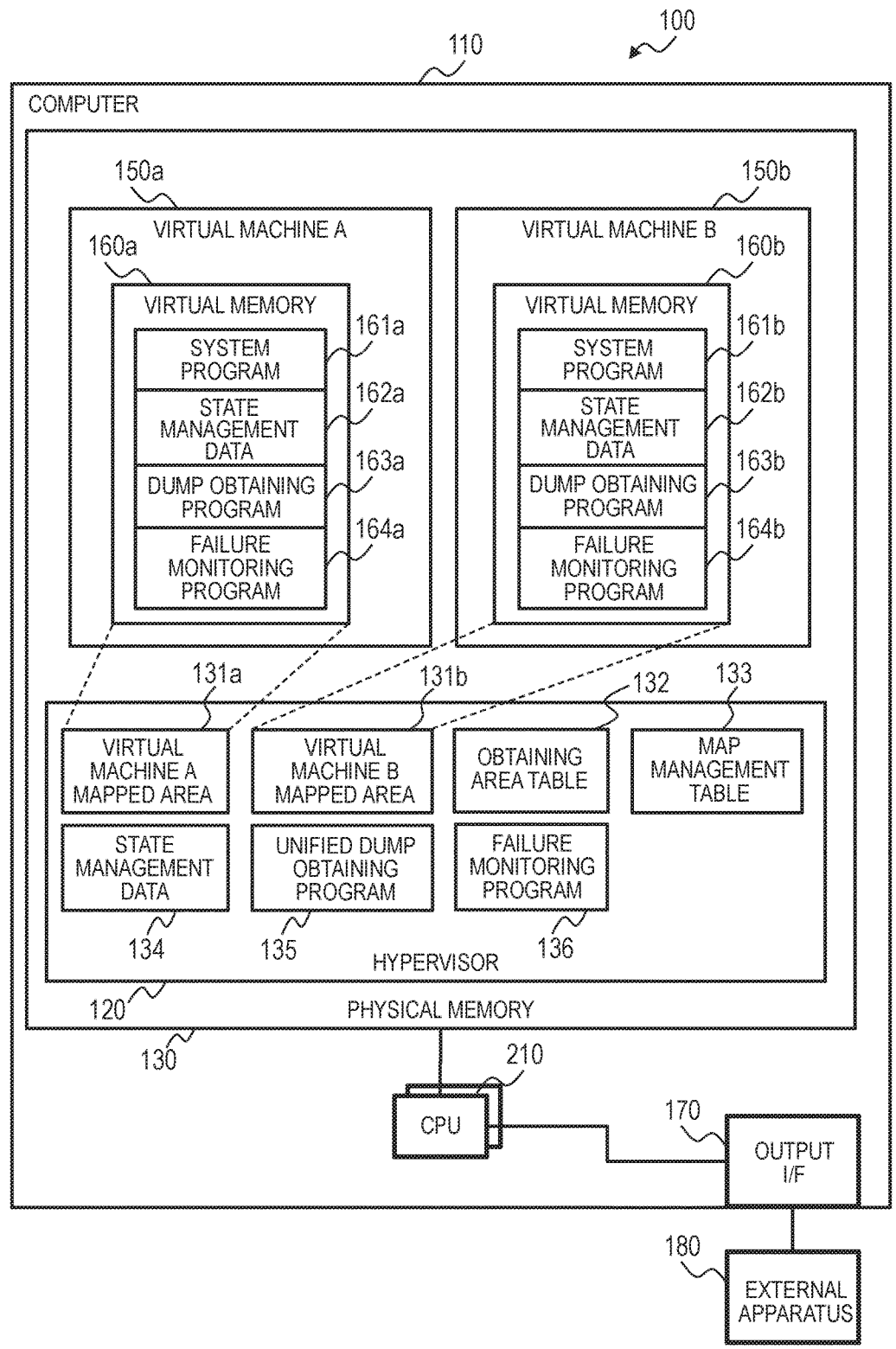
FIG. 1 is a block diagram illustrating a configuration of a computer system according to a first embodiment of this invention.

FIG. 1 is a block diagram illustrating the configuration of a computer system 100 according to a first embodiment of this invention. A computer 110 which forms the computer system 100 includes at least one CPU 210, a physical memory 130, an output interface 170, and other pieces of hardware. The output interface 170 is coupled to an external apparatus 180.

The CPU 210 loads a hypervisor 120 onto the physical memory 130 to execute the hypervisor 120. The hypervisor 120 is capable of running a plurality of virtual machines, here, virtual machines 150a and 150b, on the computer 110. The virtual machines 150a and 150b are hereinafter collectively denoted by 150. The same rule applies to other components so that components having a common reference symbol and distinguished from each other by a suffix "a" and a suffix "b" are collectively denoted by the common reference symbol minus "a" and "b".

The virtual machines 150a and 150b are allocated a virtual memory 160a and a virtual memory 160b, respectively, by the hypervisor 120. The virtual memories 160a and 160b are virtual machine mapped areas 131a and 131b which are a part of the physical memory 130 that is allocated.

Positional association relations between the virtual machine mapped area 131a and the virtual memory 160a and between the virtual machine mapped area 131b and the virtual memory 160b are stored in a map management table 133 and managed by the hypervisor 120.

A hypervisor program 137 for controlling the running of the computer 110 is loaded onto the physical memory 130 of the computer 110 and executed by the CPU 210 to function as the hypervisor 120. The hypervisor 120 runs by referring to and updating state management data 134 of the computer 110.

System programs 161a and 161b for controlling the virtual machines 150a and 150b, respectively, are loaded onto the virtual memory 160a of the virtual machine 150a and the virtual memory 160b of the virtual machine 150b, and are executed by the CPU 210 (or virtual CPUs) to function as system control modules. The system control modules are, for example, operating systems. The system control modules run by referring to and updating state management data 162a of the virtual machine 150a and state management data 162b of the virtual machine 150b.

Failure monitoring programs 136, 164a, and 164b for monitoring the state of the computer 110, the virtual machine 150a, and the virtual machine 150b, respectively, are loaded onto the physical memory 130, the virtual memory 160a, and the virtual memory 160b to be executed by the CPU 210 (or virtual CPUs). The failure monitoring programs 136, 164a, and 164b each function as a failure monitoring module. The failure monitoring program 136 monitors for a failure in the computer 110 and in the hypervisor 120. The failure monitoring programs 164a and 164b monitor for a failure in the virtual machine 150a and in the virtual machine 150b, respectively.

When a failure is detected in one of the computer 110, the virtual machine 150a, and the virtual machine 150b by the relevant failure monitoring program 136, 164a, or 164b, the failure monitoring program notifies the failure to a unified dump obtaining program 135, which is stored in the physical memory 130, and the unified dump obtaining program 135 executes dump processing for the physical memory 130, the virtual memory 160a, or the virtual memory 160b.

The dump processing is processing of copying the contents of the physical memory 130, the virtual memory 160a, or the virtual memory 160b at the time of a failure to the external apparatus 180 for later failure analysis. When notified of a failure by the failure monitoring program 136, 164a, or 164b, the unified dump obtaining program 135 refers to an obtaining area table 132 and identifies target data to be obtained that is associated with the specifics of the failure.

The unified dump obtaining program 135 next requests a dump obtaining program 163a in the virtual memory 160a or a dump obtaining program 163b in the virtual memory 160b to transfer to the unified dump obtaining program 135 target data that corresponds to the data to be obtained out of the state management data 162a of the virtual machine 150a or the state management data 162b of the virtual machine 150b.

The unified dump obtaining program 135 receives from the dump obtaining program 163a or 163b data that corresponds to the target data to be obtained out of the state management data 162a or 162b, and transfers the received the target data and data to be obtained in the state management data 134 of the computer 110 itself, along with the map management table 133, to the external apparatus 180 via the output interface 170.

Through the dump processing described above, only data relevant to the specifics of the failure is copied to the external apparatus 180 out of the state management data 134, 162a, and 162b, and copying data irrelevant to the failure is avoided. The capacity that is consumed by data copied to the external apparatus 180 is accordingly smaller than when the whole contents of the physical memory 130, the virtual memory 160a, and the virtual memory 160b are copied, and the time required to transfer the data via the output interface 170 is reduced as well.

The hypervisor 120 and the system control modules of the virtual machines 150 are loaded onto the physical memory 130 as programs.

The CPU 210 executes processing as programmed by the programs of the respective function modules, thereby operating as function modules that provide given functions. For instance, the CPU 210 functions as the hypervisor 120 by executing processing as programmed by the hypervisor program 137. The same applies to other programs. The CPU 210 also operates as function modules that provide functions of a plurality of processing procedures executed by the respective programs. The computer and the computer system are an apparatus and a system that include those function modules.

Programs that implement the respective functions of the hypervisor 120 and the virtual machines 150, tables, and other types of information can be stored in the external apparatus 180, in a non-volatile semiconductor memory, in a storage device such as a hard disk drive or a solid state drive (SSD), or in a computer-readable non-transitory data storage medium such as an IC card, an SD card, or a DVD.

A more detailed description is given below on the computer system 100.

Figure 2:
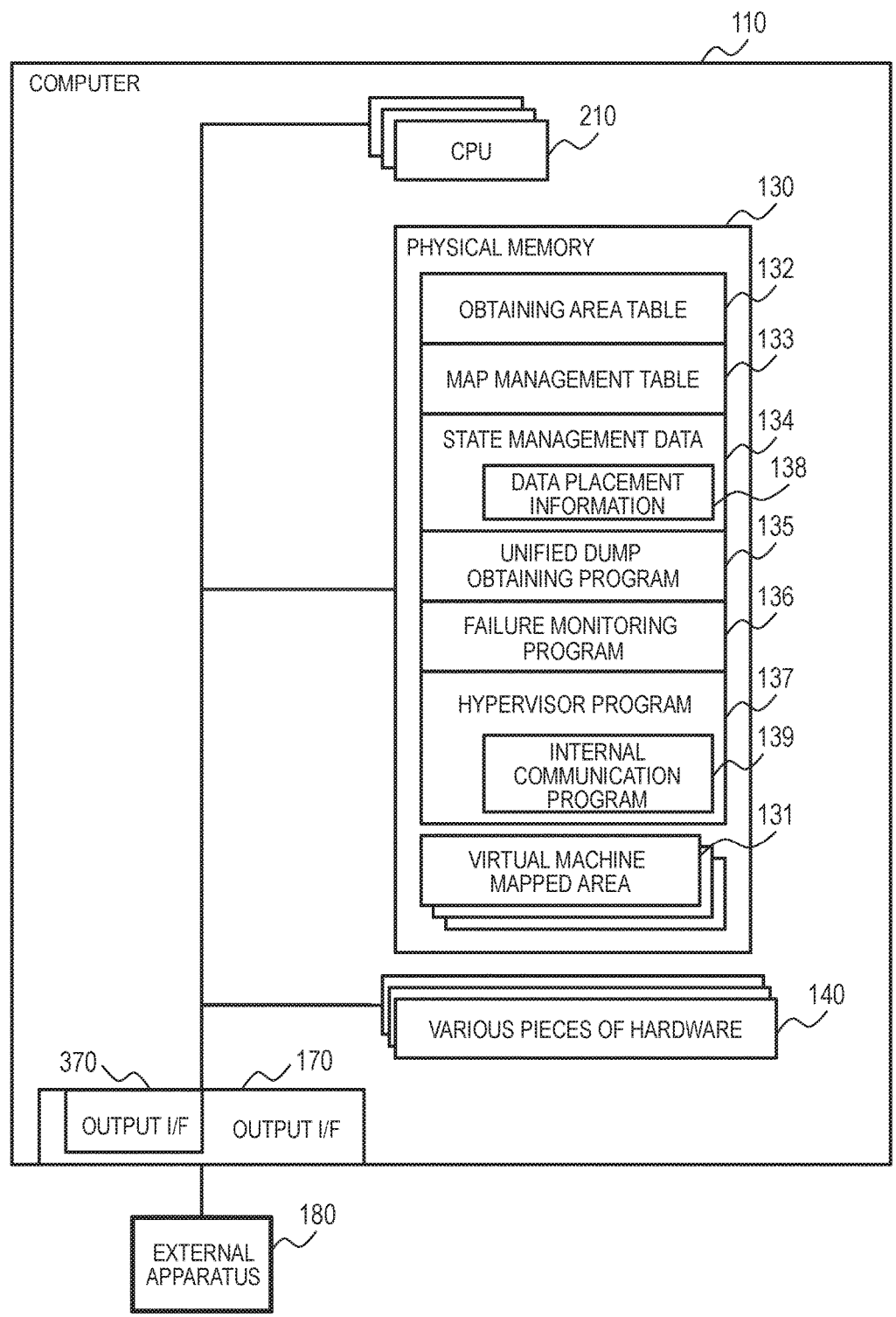
FIG. 2 is a block diagram illustrating the configuration of the computer according to the first embodiment of this invention.

FIG. 2 is a block diagram illustrating the configuration of the computer 110. The computer 110 includes the at least one central processing unit (CPU) 210, the physical memory 130, the output interface 170, and various pieces of hardware 140.

The CPU 210 leads programs and tables stored in the physical memory 130 to control the components of the computer 110. The physical memory 130 stores the obtaining area table 132, the map management table 133, the state management data 134, the unified dump obtaining program 135, the failure monitoring program 136, and the hypervisor program 137. The physical memory 130 also contains as many virtual machine mapped areas 131 as the number of the virtual machines 150 running concurrently.

The obtaining area table 132 holds an association relation between the type of an expected failure and the structure (or type) of data that is obtained out of the state management data 134 in response to the failure. The map management table 133 is a table that indicates association relations between the virtual machine mapped areas 131 and the virtual memories 160 in the virtual machines 150.

The state of apparatus included in the computer 110 is stored as the state management data 134. Data placement information 138 indicates which data structure in the state management data 134 is stored in which memory area. The state management data 134 includes, for example, the state of the CPU 210, the output interface 170, and other pieces of hardware housed in the computer 110, and information on the logical operation state such as a user's computer utilization situation and the situation of communication between the computer 110 and another computer in a network.

The unified dump obtaining program 135 is a program for copying data that is in the physical memory 130 and data that is in the relevant virtual memory 160 at the time of a failure to the external apparatus 180 via the output interface 170.

The hypervisor program 137 is a program for managing the components of the computer 110 and also for running and managing the virtual machines 150. The hypervisor program 137 can be a KVM (http://www.linux-kvm.org/page/Main_Page) or the like.

The virtual machine mapped areas 131 in the physical memory 130 are areas that are respectively associated with the virtual memories 160 of the virtual machines 150. When the virtual machines 150 read or write in the content of the virtual memories 160, the hypervisor 120 reads or writes in the corresponding content of the associated virtual machine mapped areas 131.

The hypervisor program 137 is capable of transfer ring/receiving a small amount of data to/from the virtual machines 150 via the CPU 210, but it takes long for the hypervisor program 137 to transfer/receive large-capacity data such as a memory dump. The hypervisor program 137 therefore contains an internal communication program 139, which implements an internal communication path between the hypervisor program 137 and each virtual machine 150. The internal communication program 139 provides common means of data sharing such as a shared memory and a communication queue to the virtual machine 150, thus enabling the hypervisor program 137 to transfer/receive a memory dump. For example, the internal communication program 139 sets a queue in a shared memory to execute communication between the virtual machine 150 and the hypervisor 120.

The external apparatus 180 is an apparatus that stores a memory dump transferred at the time of a failure from the unified dump obtaining program 135 via the output interface 170. The output interface 170 and the external apparatus 180 can be, for example, a host bus adaptor (HBA) and a hard disk drive (HDD), respectively, to transfer a memory dump by Small Computer System Interface (SCSI). The output interface 170 and the external apparatus 180 can also be a network interface card (NIC) and another computer, respectively, to transfer a memory dump by Transmission Control Protocol/Internet Protocol (TCP/IP). Other examples than those given above include one in which the external apparatus 180 is a USB flash drive or a similar storage apparatus that is coupled to the computer 110.

The output interface 170 includes a single-root IO virtualization (SR-IOV) interface which enables a plurality of computers to use a single I/O (device), and is capable of allocating a plurality of output interfaces 370 to the virtual machines 150. The virtual machines 150 can use the output interfaces 370 allocated by the hypervisor 120 as physical interfaces. Alternatively, the virtual machines 150 may use physical I/O device exclusively.

The computer 110 also includes the various pieces of hardware 140 which are managed by the hypervisor program 137. The virtual machines 150 can use the various pieces of hardware 140 via the hypervisor program 137 when necessary.

The various pieces of hardware 140 include, for example, an input apparatus such as a keyboard, a video output apparatus such as a display, an audio input/output apparatus, a serial console, a network interface, and a disk interface.

Figure 3:
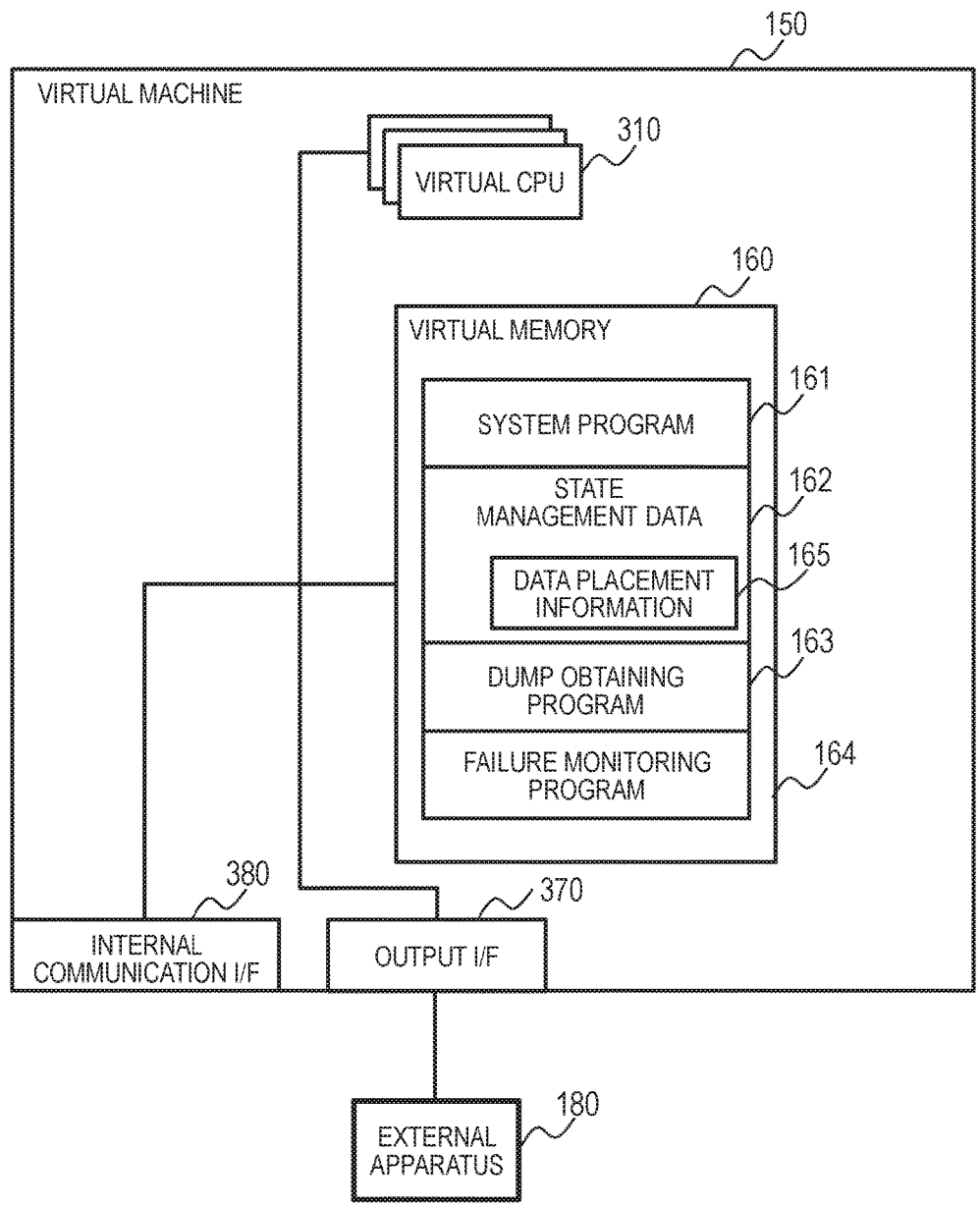
FIG. 3 is a block diagram illustrating the configuration of each virtual computer according to the first embodiment of this invention.

FIG. 3 is a block diagram illustrating the configuration of each virtual machine 150. The virtual machine 150 does not possess computer hardware on its own, and is built from a part of the hardware of the computer 110 under control of the hypervisor program 137. To various programs running on the virtual machine 150, however, the virtual machine 150 behaves as though the virtual machine 150 is a full computer. A plurality of virtual machines 150 can run concurrently because each virtual machine 150 is built from a part of the hardware of the computer 110.

Each virtual machine 150 includes at least one virtual CPU 310 and one virtual memory 160. The virtual CPU 310 loads various programs stored in the virtual memory 160 to control components of the virtual memory 160. The virtual CPU 310 is built by allocating a part of the operating time of the CPU 210 through time division, or by allocating some of a plurality of CPUs 210.

The virtual memory 160 is a memory area that is associated with one of the virtual machine mapped areas 131 in the physical memory 130 under control of the hypervisor program 137. The virtual memory 160 stores the system program 161, state management data 162, dump obtaining program 163, and failure monitoring program 164 of this virtual machine 150.

The system program 161 is a program for managing the components of the virtual machine 150. The state of apparatus included in the virtual machine 150 and the state of the system program 161 are stored as the state management data 162. Stored as data placement information 165 is an association table that indicates which data structure in the state management data 162 is stored in which memory area.

The dump obtaining program 163 is a program that receives from the unified dump obtaining program 135 an instruction to obtain a memory dump when a failure occurs, and then transfers the contents of the virtual memory 160 (a memory dump) at the time of the failure to the external apparatus 180 via an internal communication interface 380 or the output interface 370 of this virtual machine 150. The output interface 370 is, as described above with reference to FIG. 2, a function provided by the output interface 170 and can be used as a physical interface.

The internal communication interface 380 is a communication path between the virtual machine 150 and the computer 110, and is generated by the internal communication program 139. The dump obtaining program 163 of the virtual machine 150 can transfer a memory dump of the virtual memory 160 to the unified dump obtaining program 135 of the computer 110 via the internal communication interface 380. Memory dump transmission to the external apparatus 180 is handled by the unified dump obtaining program 135.

The virtual machine 150 may instead transfer a memory dump directly to the external apparatus 180 via the output interface 370. The external apparatus 180 and the output interface 370 may be provided to the virtual machine 150 as a memory dump storage location. Which of the internal communication interface 380 and the output interface 370 is to be used as the path of memory dump transmission is specified in the obtaining area table 132.

The virtual machine 150 configured as above has two communication paths, that is, a path for transferring from the hypervisor 120 via the internal communication interface 380 and a path for transferring directly to the external apparatus 180 via the output interface 370, as the route along which the contents of the virtual memory 160 are copied to the external apparatus 180.

This enables the virtual machine 150 to copy the contents of the virtual memory 160 to the external apparatus 180 even when a failure occurs in the internal communication interface 380 or the internal communication path.

FIG. 4 shows an example of the map management table 133. The map management table 133 is a table for managing the association between the virtual memories 160 of the virtual machines 150 and locations in the physical memory 130.

The map management table 133 includes a virtual machine ID 410, an offset 420, and a size 430 as items, and has as many entries as the number of the virtual machines 150, here, entries 441, 442, and 443. Stored in an entry as the virtual machine ID 410 is an identifier such as a letter string or a numerical value that uniquely identifies the virtual machine 150 for which the entry is created.

The offset 420 indicates an association relation in location between the physical memory 130 and the virtual memory 160 in question. The location is expressed by a head address in the physical memory 130 that corresponds to the starting location of the virtual memory 160. The size 430 indicates the size of an area allocated to the virtual memory 160. For example, in the case of the entry 441 which holds an offset "0x40000000", an address P of the virtual memory 160 is associated with an address in the physical memory 130 "P+0x40000000" which is obtained by adding the offset.

The map management table 133 may be configured by other methods than the one shown in FIG. 4. For example, a plurality of contiguous areas in the physical memory 130 may be joined to be associated with one virtual memory 160. Alternatively, the physical memory 130 and the virtual memories 160 may each be managed as an aggregation of pages having a fixed length so that the map management table 133 serves as a table that associates the address of each virtual memory 160 with a page in the physical memory 130. The addresses of the virtual memories 160 can be associated with addresses in the physical memory 130 by any of those methods.

An area in the physical memory 130 may be associated with a plurality of virtual memories of the virtual machine 150.

FIG. 5 shows an example of the data placement information 138. The data placement information 138 indicates which area in the physical memory 130 stores a data structure in the state management data 134, and has one entry for each data structure, here, entries 541, 542, and 543.

A data structure name 510 is stored in each entry which is a name that uniquely identifies a data structure for which the entry is created. An offset 520 in the entry indicates a head address in the physical memory 130 where the data structure of the entry is stored. A size 530 in the entry indicates the size of an area that stores the data structure of the entry.

The data placement information 165 of each virtual machine 150 has the same structure as that of the data placement information 138. However, the offset 520 in the data placement information 165 indicates a head address in the relevant virtual memory 160 instead of a head address in the physical memory 130.

The data placement information 138 and the data placement information 165 can be configured by other methods than the one shown in FIG. 5. For example, the physical memory 130 and the virtual memories 160 may each be managed as an aggregation of pages having a fixed length so that the data placement information 138 and the data placement information 165 each serve as a table that associates each data structure page with a page in the physical memory 130 or in one of the virtual memories 160.

FIG. 6 shows an example of the obtaining area table 132. The obtaining area table 132 sorts, by the cause of failure, areas for which a memory dump is to be obtained out of the state management data 134 or 162 when a failure occurs.

The obtaining area table 132 has a row 650 for each data structure in the computer 110 or the virtual machines 150. A data structure 620 in one row 650 indicates a part of the state management data 134 of the computer 110, or a part of the state management data 162 of one of the virtual machines 150, depending on whether the row 650 is associated with the computer 110 or one of the virtual machines 150.

An ID 610 is stored in each row 650 which is an identifier that uniquely identifies a computer associated with the row 650. The row 650 where the ID 610 is "hypervisor" is for a data structure in the computer 110.

The row 650 where the ID 610 is "virtual #+numerical value" is for a data structure in the virtual machine 150 that is associated with the numerical value in the ID 610.

Failure causes 630 are a list of failures detected by the failure monitoring program 136 or the failure monitoring programs 164. The obtaining area table 132 has as many columns 640 as the number of the failure causes 630.

A setting item 660 is a cell where one row 650 and one column 640 intersect, and indicates a priority level at which the data structure 620 in a computer identified by the ID 610 in the row 650 is copied when a cause of the column 640 causes a failure. A given letter string such as "A", "B", or "C" is stored as the setting item 660 to specify a priority level that is set to the data structure 620 for the failure cause 630 of the column 640 in question.

In the case where "B" is set as the priority level, for example, the data structures 620 that have "B" or a value indicating a higher priority level as the setting item 660 ("A" and "B" in the shown example) are selected in the order of priority. The values "A", "B", and "C" indicate priority levels that, for example, decrease in the order stated (A>B>C). In the case where the failure cause 630 of the column 640 in question is "time error" and the priority level is B, process information of the hypervisor and of the virtual machines and an operation log of the hypervisor are selected.

In this embodiment, the data structure 620 for which "C" is stored as the setting item 660 in one of the columns 640 for the failure causes 630 is not copied when a failure is caused by the failure cause 630 of the column 640 in question. The priority level may instead be expressed by a numerical value or the like.

The obtaining area table 132 also holds suspension settings 670 and a virtual memory transmission interface 680 for each of the columns 640 for the failure causes 630.

The suspension settings 670 indicate whether some or all of the computer 110 and the virtual machines 150 are suspended to obtain a memory dump, or keep running while a memory dump is obtained, when a failure associated with the column 640 occurs.

The virtual memory transmission interface 680 indicates which of the internal communication interface 380 and the output interface 370 is used to output the contents of the relevant virtual memory 160 when a failure associated with the column 640 occurs.

The obtaining area table 132 may be set by a user of the computer system 100 by selecting the data structure 620 that is necessary for failure analysis, or may be set by the unified dump obtaining program 135 by calculating a table configuration from the configuration of the computer 110 such as the capacity of the physical memory 130. For example, when the physical memory 130 has an extremely large capacity, the unified dump obtaining program 135 may set the obtaining area table 132 so that the data structures 620 to be obtained are narrowed down in order to prevent dump obtainment from taking long.

Examples in which a user of the computer system 100 sets the obtaining area table 132 are given below. The state management data 134 and the state management data 162 increase in proportion to an increase in the capacity of the physical memory 130 and the virtual memories 160. Accordingly, when the obtaining area table 132 is set for the computer 110 that has many physical memories 130 and virtual memories 160, the total capacity required to copy data can be reduced by increasing the number of the data structures 620 that are not to be copied.

In another setting example, the obtaining area table 132 may be set to have a plurality of columns 650 for different states of the internal communication path so that different manners of control are performed when the cause of a failure is the internal communication path.

For example, a value indicating the output interface 370 is stored as the virtual memory transmission interface 680 in the column 650 that is associated with a failure where communication over the internal communication path is completely lost in both ways. In the column 650 for a failure where communication over the internal communication path is lost only in one way, from the computer 110 to the virtual machines 150, on the other hand, a value indicating the internal communication interface 380 is stored as the virtual memory transmission interface 680.

In still another setting example, in the case where the computer 110 has a plurality of output interfaces 170 and a plurality of external apparatus 180, the obtaining area table 132 may be set so that different output interfaces 170 and different external apparatus 180 are used for different failure causes. For instance, a value indicating the output interface 170 that is high in data transfer rate may be set as the virtual memory transmission interface 680 when this output interface 170 is available, whereas a value indicating another output interface 170 which is low in transfer rate is set as the virtual memory transmission interface 680 when the output interface 170 that is high in transfer rate is the cause of a failure.

In yet still another setting example, the columns 640 for the failure causes 630 may include columns for storing other causes than those that indicate an anomaly in the computer 110. Such causes may include, for example, a memory dump obtaining request that is issued by a user of the computer system 100 and memory dump obtaining requests that are issued by other computers in the computer system 100 than the computer 110.

Those causes, in conjunction with a memory dump of the computer 110, are useful for analysis when a failure occurs not in the computer 110 itself but in another computer in the computer system 100 which executes calculation processing through communication to/from the computer 110.

Figure 7:
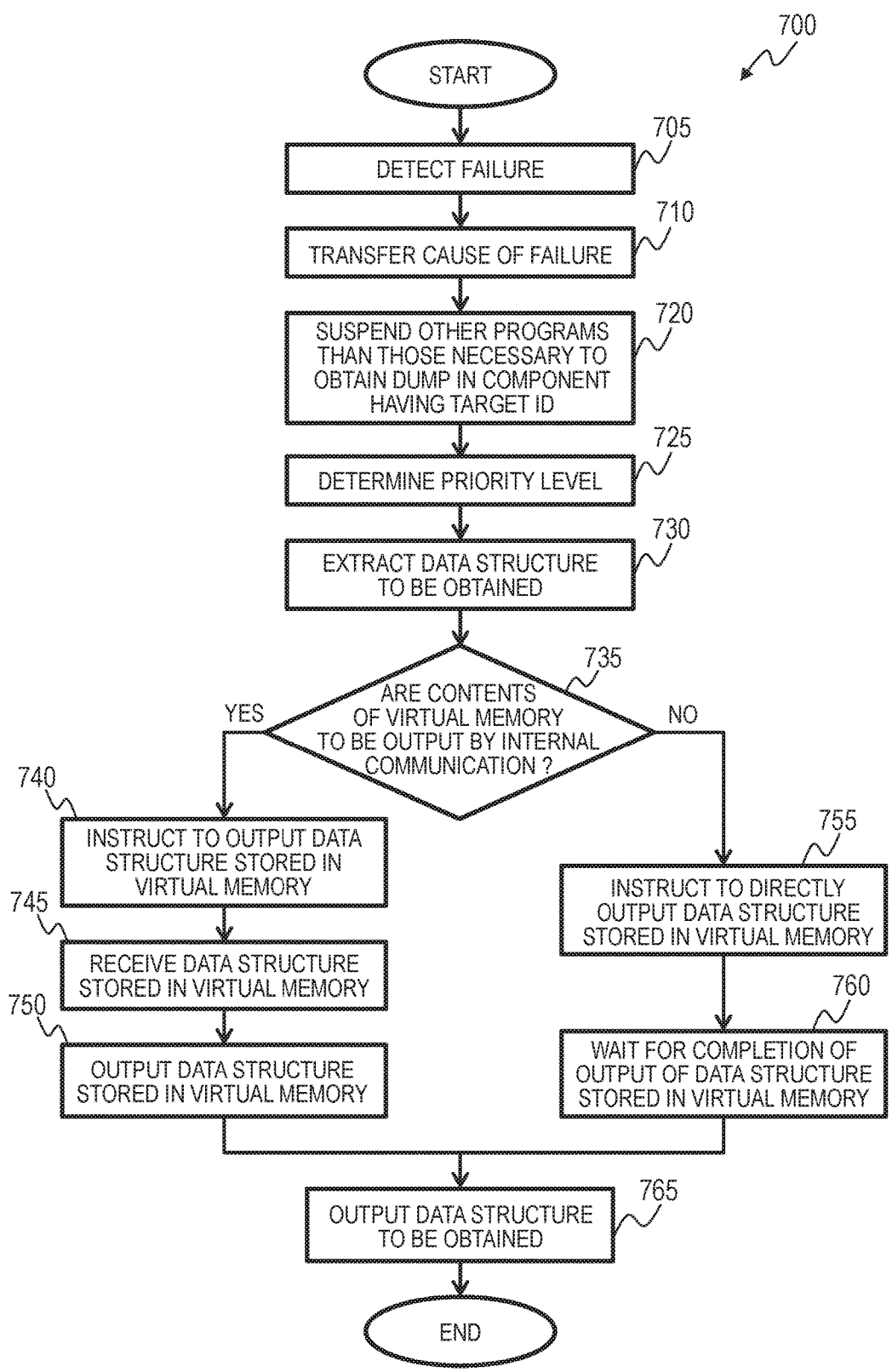
FIG. 7 is a flow chart illustrating an example of cooperated dump obtaining processing which is executed in the computer system according to the first embodiment of this invention.

FIG. 7 is a flow chart illustrating an example of cooperated dump obtaining processing 700 which is executed in the computer system 100. The cooperated dump obtaining processing 700 is processing in which the unified dump obtaining program 135 of the hypervisor 120 and the dump obtaining program 163 of the relevant virtual machine 150 execute memory dumping for the narrowed down contents of the virtual memory 160 of the virtual machine 150 in cooperation with each other.

The cooperated dump obtaining processing 700 is started with a failure detection notification from the failure monitoring program 136 of the computer 110 or the failure monitoring program 164 of one of the virtual machines 150 as a trigger (Step 705).

Examples of failures detected by the failure monitoring programs 136 and 164 include a failure in a physical component such as the CPU 210 or the physical memory 130, an irregularity in logical state due to a bug in one of the programs, and the loss of communication to or from, or to and from, another computer. The failure monitoring program 136 or 164 that has detected a failure transfers the cause of the detected failure to the unified dump obtaining program 135 (Step 710).

The unified dump obtaining program 135 identifies one of the columns 640 of the obtaining area table 132 from the received failure cause. The unified dump obtaining program 135 refers to the suspension settings 670 in the identified column 640 and, when the value of the suspension settings 670 is "all", suspends all virtual machines 150. The unified dump obtaining program 135 suspends all programs of the virtual machines 150 except the unified dump obtaining program 135, the dump obtaining programs 163, and the internal communication program 139 which are necessary to obtain a memory dump, thereby preventing the operation of the programs from changing the state management data 134 and 162 subsequently (Step 720).

In the case where the value of the suspension settings 670 is "relevant ID", the unified dump obtaining program 135 suspends programs in the virtual machine 150 that is relevant to the failure cause, except the unified dump obtaining program 135, the dump obtaining program 163, and the internal communication program 139 which are necessary to obtain a memory dump. The unified dump obtaining program 135 thus prevents the operation of the programs from changing the state management data 134 and 162 subsequently. For example, when there is a failure in one of the plurality of virtual machine mapped areas 131 contained in the physical memory 130, suspension target of programs are only in the virtual machine 150 that uses this virtual machine mapped area 131.

In the case where the value of the suspension settings 670 is "none", memory dump processing is executed while the computer 110 and the virtual machines 150 keep running.

The unified dump obtaining program 135 next determines the priority level in order to identify an area for a data structure to be obtained (Step 725).

This determination may use the value of a priority level that is set in advance by the unified dump obtaining program 135 or, in the case where the programs are suspended in Step 720, may use a priority level that is input by a user of the computer system 100. The user of the computer system 100 determines a priority level in view of the amount of data obtained for failure analysis and the time required for memory dumping, and can set the priority level through an input interface (not shown). The unified dump obtaining program 135 obtains the set or input priority level, and determines the value of a priority level for selection from the obtaining area table 132. The unified dump obtaining program 135 uses the obtained priority level as a threshold and selects data structures to which a priority level equal to or higher than the threshold is set, thereby accomplishing the narrowing down of data structures.

The unified dump obtaining program 135 refers to the columns 640 of the obtaining area table 132 with the priority level value determined in Step 725 as a key, and obtains the ID 610 and the data structure 620 from each entry where the setting item 660 indicates a priority level higher than the determined priority level (Step S730). The ID 610 and data structure 620 obtained in this step are target of data to be obtained in the subsequent processing steps.

The unified dump obtaining program 135 next refers to a cell where the virtual memory transmission interface 680 intersects with the relevant column 640 of the obtaining area table 132 to determine which of the internal communication interface 380 and the output interface 370 is to be used to output the contents of each relevant virtual memory 160 based on whether a value "internal" or "output" is stored in the cell (Step 735).

When it is determined in Step 735 that the contents of the virtual memory 160 are output via the internal communication interface 380, the unified dump obtaining program 135 instructs the dump obtaining program 163 of each relevant virtual machine 150 to transfer, via the internal communication interface 380, to the unified dump obtaining program 135, data in an area out of the state management data 162 in the virtual memory 160 that corresponds to the data structure 620 obtained in Step 730 (Step 740).

The unified dump obtaining program 135 receives, from the dump obtaining program 163 of each relevant virtual machine 150, via the internal communication interface 380, the data in the area that corresponds to the data structure 620 obtained in Step 730 (Step 745). The unified dump obtaining program 135 next transfers the received data to the external apparatus 180 via the output interface 170 (Step 750).

In Step 750, the unified dump obtaining program 135 transfers to the external apparatus 180 the mapped management table 133 together with the received data so that an address in the virtual memory 160 and an address in the physical memory 130 can be associated with each other in a failure analysis conducted later.

Steps 740 to 750 may be executed as many times as the number of the virtual machines 150, or may be executed in parallel for one virtual machine 150 and for another virtual machine 150. It is not necessary for each relevant virtual machine 150 to output the entirety of the data structure 620 in one round of execution of Steps 740 to 750; the data structure 620 may be broken into a size that can be transferred/received at once over the internal communication path so that the data structure 620 is transferred fully by repeating Steps 740 to 750 a plurality of times.

When it is determined in Step 735 that the contents of the virtual memory 160 are output via the output interface 370, the unified dump obtaining program 135 instructs the dump obtaining program 163 of each relevant virtual machine 150 to transfer, directly to the external apparatus 180, with the use of the output interface 370, the data in the area that corresponds to the data structure 620 obtained in Step 730 out of the state management data 162 in the virtual memory 160 (Step 755). The unified dump obtaining program 135 then stands by until the dump obtaining program 163 finishes transferring the data structure 620 to the external apparatus 180 (Step S760).

After finishing Step 750 or 760, the unified dump obtaining program 135 refers to the data placement information 138 to identify an area that corresponds to the data structure 620 obtained in Step 730 out of the state management data 134 of the computer 110 itself, and transfers data in the identified area and the data placement information 138 to the external apparatus 180 via the output interface 170 (Step 765).

Through the processing described above, the unified dump obtaining program 135 suspends as needed a computer where a failure has occurred and a computer that is relevant to the failure considering the cause of the failure. The unified dump obtaining program 135 extracts from the obtaining area table 132 a data structure to be obtained based on the failure cause and priority, and transfers a copy of the data structure to the external apparatus 180 on a given path.

Figure 8:
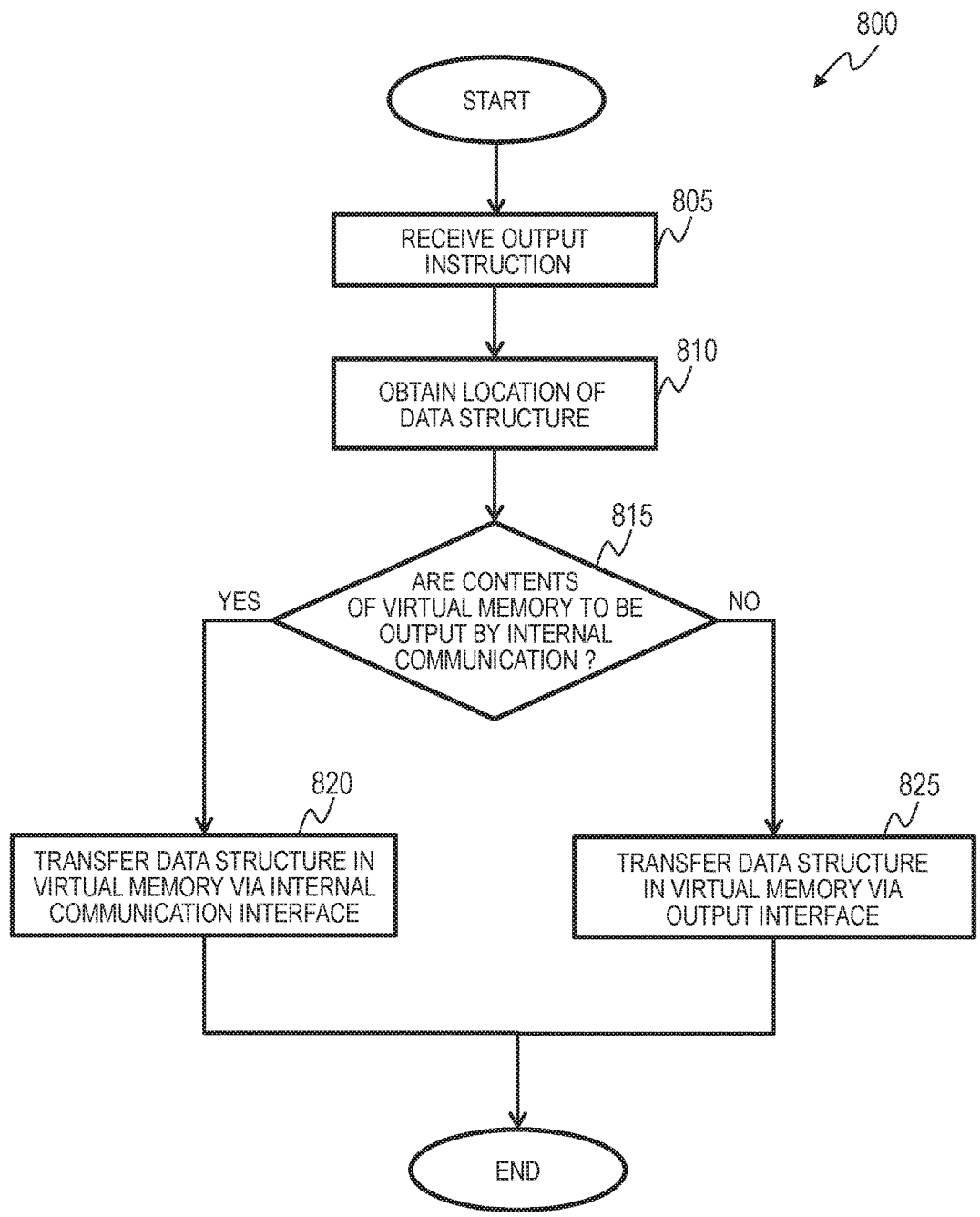
FIG. 8 is a flow chart illustrating an example of virtual memory dump obtaining processing which is executed in each relevant virtual computer according to the first embodiment of this invention.

FIG. 8 is a flow chart illustrating an example of virtual memory dump obtaining processing 800 which is executed in each relevant virtual machine 150. The virtual memory dump obtaining processing 800 is executed by the unified dump obtaining program 135 during the cooperated dump obtaining processing 700 described above, in Step 740 or 750 of FIG. 7. The unified dump obtaining program 135 instructs the dump obtaining program 163 to output the data structure, thereby starting the running of the dump obtaining program 163. When giving the instruction, the unified dump obtaining program 135 notifies to the dump obtaining program 163 the data structure 620 to be obtained and information indicating which interface is to be used for dump transmission (Step 805).

The dump obtaining program 163 refers to the data placement information 165 to obtain, from the state management data 162, the location in the virtual memory 160 of the data structure 620 to be obtained which has been notified in Step 805 (Step 810).

The dump obtaining program 163 determines, from the interface information notified in Step 805, which of the internal communication interface 380 and the output interface 370 is to be used for output (Step 815).

When it is determined in Step 815 that the internal communication interface 380 is to be used for output, the dump obtaining program 163 transfers the data structure 620 whose location in the virtual memory 160 has been identified in Step 810 to the unified dump obtaining program 135 via the internal communication interface 380 (Step 820).

When it is determined in Step 815 that the output interface 370 is to be used for output, the dump obtaining program 163 transfers the data structure 620 whose location in the virtual memory 160 has been identified in Step 810 to the external apparatus 180 via the output interface 370 (Step 825).

In the case where the unified dump obtaining program 135 notifies in Step 805 a plurality of data structures 620 to be obtained, the dump obtaining program 163 may execute Steps 810 to 825 for the plurality of data structures 620 at once, or may repeat Steps 810 to 825 for each of the plurality of data structures 620, or may process the plurality of data structures 620 in parallel in Steps 810 to 825.

The cooperated dump obtaining processing 700 and the virtual memory dump obtaining processing 800 enable the computer 110 having detected a failure to unified to the external apparatus 180 only the data structure 620 that is determined as relevant to the cause of the failure based on information in the obtaining area table 132, out of the state management data 134 of the computer 110 and the state management data 162 of the virtual machines 150.

The processing 700 prevents the transmission of the data structure 620 that is not used for failure analysis to the external apparatus 180, thus reducing the time required to transfer the data structures 620 and the storage area of the external apparatus 180.

In the obtaining area table 132 of the hypervisor 120 in this invention, a priority level that depends on the computer type (ID 610) and the data structure 620 is set to each of the columns 640 for the failure causes 630. The obtaining area table 132 sets a high priority level to a data structure that is closely relevant to the cause of a failure, and a low priority level to a data structure that is not directly relevant to the cause of a failure.

When a failure occurs, the unified dump obtaining program 135 obtains a priority level and selects a data structure that reaches the priority level or higher as a target of memory dumping. Memory dumping of data structures irrelevant to a failure can therefore be avoided by setting the priority level to a given value (for example, "B") or higher and thus limiting memory dump targets to data structures (or data types) relevant to the cause of a failure. By narrowing down data areas for which a memory dump is to be obtained at the time of a failure in this manner, the capacity of a storage medium that stores a memory dump and the time required to copy data in a memory can be reduced.

Setting priority also makes it possible to adjust the range of obtaining a memory dump based on priority. For example, when the priority level "A" is specified, memory dump targets are limited to data structures that are closely relevant to the cause of a failure, and memory dumping of data structures that are not directly relevant to the failure can be avoided.

The type of a computer (virtual machine, hypervisor) to be suspended may be set for each failure cause in the obtaining area table 132 so that the virtual machine 150 that is not affected by the failure can keep running.

Each virtual machine 150 has the internal communication interface 380 and one output interface 370 which is capable of direct communication to and from the external apparatus 180. This ensures that data in the virtual memory 160 of the virtual machine 150 can be copied as a memory dump directly to the external apparatus 180 with the use of the output interface 370 even when a failure occurs in the internal communication interface 380 or in the internal communication path (the hypervisor 120 or the virtual memory 160). The reliability in obtaining a memory dump is thus improved.

Second Embodiment

Figure 9:
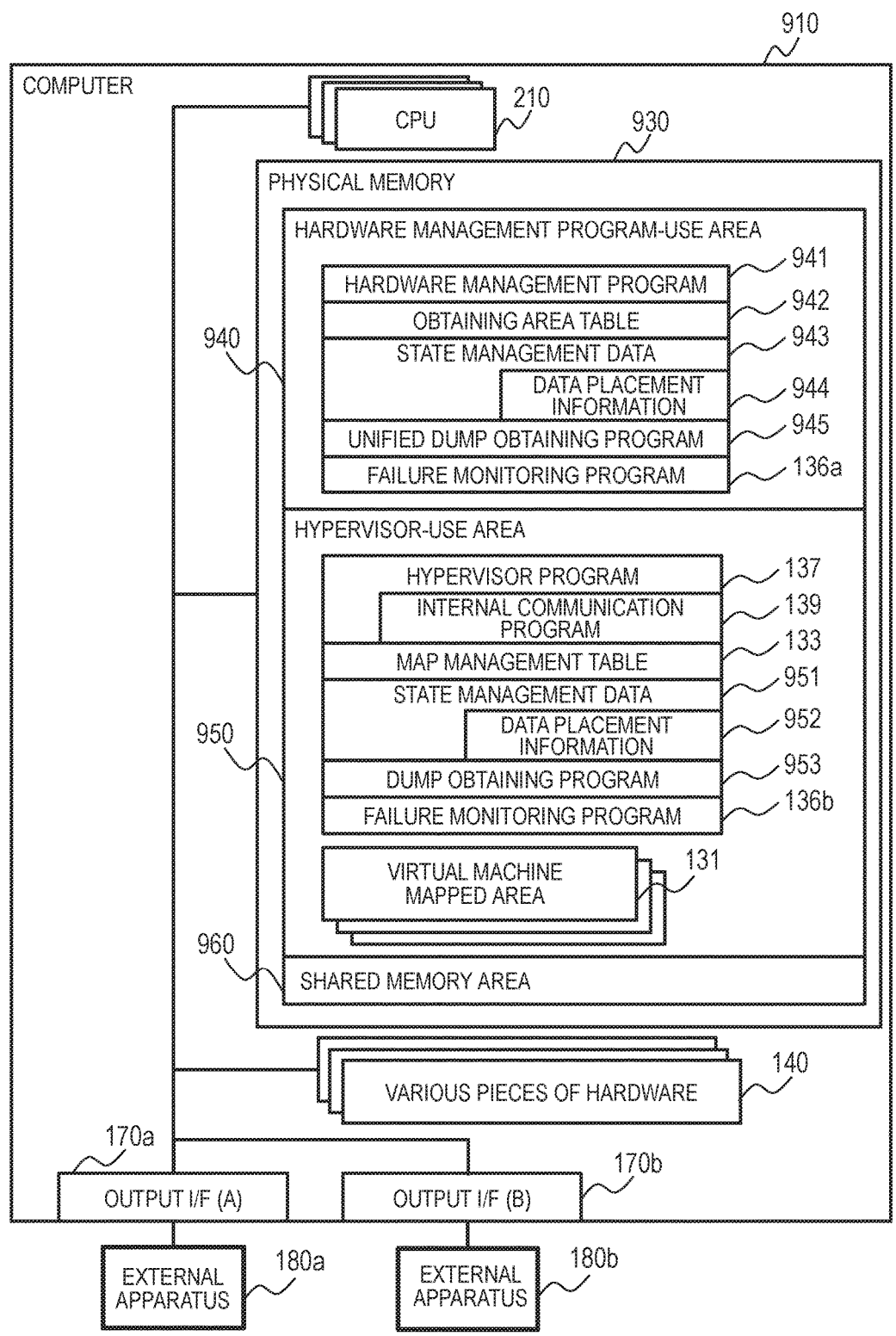
FIG. 9 is a block diagram illustrating an example of a computer which forms the computer system according to a second embodiment of this invention.

FIG. 9 is a block diagram illustrating an example of a computer 910 which forms the computer system 100 according to a second embodiment of this invention. In the second embodiment, the computer 910 replaces the computer 110 of the first embodiment. The computer system 100 of the second embodiment includes two external apparatus, 180a and 180b.

The computer 910 includes at least one CPU 210, a physical memory 930, output interfaces 170a and 170b, the external apparatus 180, and the various pieces of hardware 140.

The computer 910 differs from the computer 110 of the first embodiment in that a hardware management program (hardware management module) 941 and the hypervisor program 137 divide resources of the computer 910 between the two and run concurrently.

The hardware management program 941 is, for example, a system that controls the external apparatus 180a in response to a received I/O request. The hypervisor program 137 is the same as the one in the first embodiment, and functions as the hypervisor 120 which runs a plurality of virtual machines 150.

In the case where the computer 910 includes a plurality of CPUs 210, a plurality of sets of various pieces of hardware 140, a plurality of output interfaces 170, here, 170a and 170b, the computer resources of the computer 910 may be divided into a number that represents the sum of the hardware management program 941 and the hypervisor program 137, or those computer resources may be divided by time division to be allocated.

A more detailed description is given on the allocation of the physical memory 930. The physical memory 930 is divided into a hardware management program-use area 940, a hypervisor-use area 950, and a shared memory area 960. The hardware management program 941 manages the hardware management program-use area 940, and the hypervisor program 137 manages the hypervisor-use area 950. The shared memory area 960 can be used by the hardware management program 941 and the hypervisor program 137 both for data sharing. For instance, the shared memory area 960 can be used by the hardware management program 941, the hypervisor program 137, and each virtual machine 150 to store time-series operation logs.

The hardware management program-use area 940 stores the hardware management program 941, an obtaining area table 942, state management data 943, data placement information 944, a unified dump obtaining program 945, and a failure monitoring program 136a.

The obtaining area table 942 holds an association relation between the type of an expected failure and the data structure that is obtained out of the pieces of state management data 943, 951, and 162 in response to the failure. Similarly to the obtaining area table 132 of the first embodiment, the obtaining area table 942 is information set in advance.

The state management data 943 and the data placement information 944 are the same as the state management data 134 and the data placement information 138, respectively, in the first embodiment, except that only data that is managed by the hardware management program 941 out of information on the state of the apparatus included in the computer 910 is stored in the state management data 943 and the data placement information 944.

The unified dump obtaining program 945 is a program for copying data that is in the physical memory 930 and data that is in the relevant virtual memory 160 (within the virtual machine mapped area 131 in FIG. 1) at the time of a failure to the external apparatus 180 via the output interface 170. The unified dump obtaining program 945 of the second embodiment has a function of executing memory dumping for the hardware management program-use area 940 in addition to the function in the first embodiment (the function of executing memory dumping for the hypervisor 120 and the virtual machines 150).

The hypervisor-use area 950 stores the hypervisor program 137, the internal communication program 139, the mapped management table 133, the state management data 951, data placement information 952, a dump obtaining program 953, a failure monitoring program 136b, and as many virtual machine mapped areas 131 as the number of the virtual machines 150 running concurrently.

The hypervisor program 137 is a program for running and managing the virtual machines 150 as in the first embodiment.

The state management data 951 and the data placement information 952 are the same as the state management data 134 and the data placement information 138, respectively, in the first embodiment, except that only data that is managed by the hypervisor program 137 out of information on the state of the apparatus included in the computer 910 is stored in the state management data 951 and the data placement information 952.

The dump obtaining program 953 is a program for copying, to the relevant external apparatus 180, via the relevant output interface 170, data that is in the hypervisor-use area 950 and data that is in the relevant virtual memory 160 (virtual machine mapped area 131) at the time of a failure out of data in the physical memory 930. The dump obtaining program 953 of the second embodiment is the same as the unified dump obtaining program 135 of the first embodiment.

FIG. 10 shows an example of the obtaining area table 942. The obtaining area table 942 is configured by adding a hypervisor-use area transmission interface 1010 to the obtaining area table 132 in the first embodiment. The hypervisor-use area transmission interface 1010 defines which communication path is to be selected when a data structure in the hypervisor-use area 950 is copied. The hypervisor-use area transmission interface 1010 can have a value "shared memory", which indicates that the dump obtaining program 953 writes data in the shared memory area 960, and a value "output", which indicates that the dump obtaining program 953 transfers data from the output interface 170b.

Values "hardware management", "hypervisor", "shared memory", and "virtual #n" can be set as the ID 610 in the obtaining area table 942, and correspond to the hardware management program-use area 940, the hypervisor-use area 950, the shared memory area 960, and one of the virtual machine mapped areas 131, respectively, in the physical memory 930.

The obtaining area table 942 is created by adding, in the obtaining area table 132 of the first embodiment, "hardware management" to the ID 610, adding "hardware information" and "I/O information" to the data structures 620 that are associated with "hardware management", and setting one of the priority levels "A" to "C" to each associated setting item 660.

The rest of the configuration of the obtaining area table 942 is the same as that of the obtaining area table 132 of the first embodiment, and a description thereof is omitted to avoid duplication.

Figure 11:
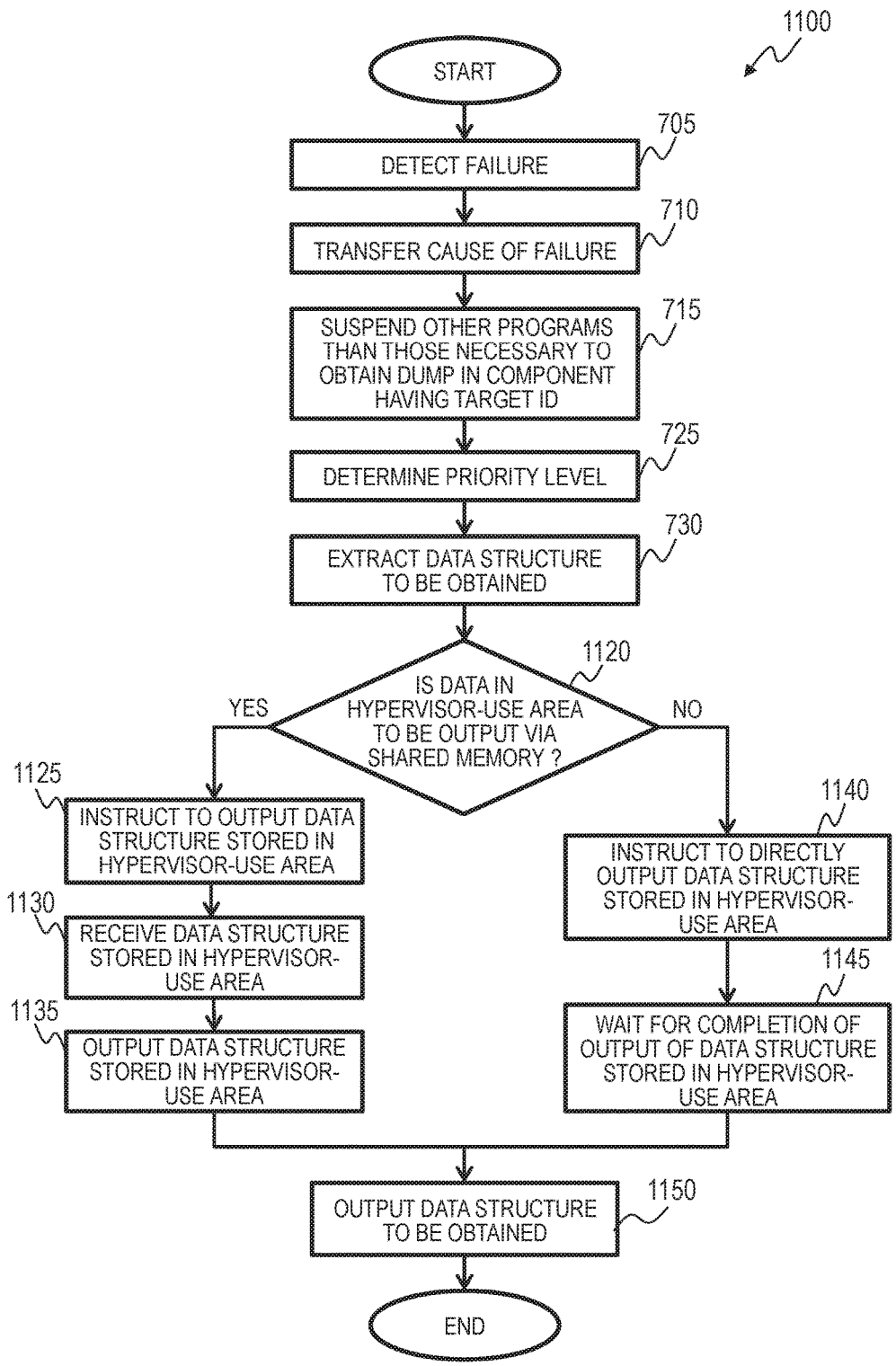
FIG. 11 is a flow chart illustrating an example of cooperated dump obtaining processing which is executed by the unified dump obtaining program of the hardware management program-use area according to the second embodiment of this invention.

FIG. 11 is a flow chart illustrating an example of cooperated dump obtaining processing 1100 which is executed by the unified dump obtaining program 945 of the hardware management program-use area 940.

The cooperated dump obtaining processing 1100 is started with a failure detection notification from the failure monitoring program 136a of the hardware management program-use area 940, the failure monitoring program 136b of the hypervisor-use area 950, or the failure monitoring program 164 of one of the virtual machines 150 as a trigger (Step 705).

Steps 710, 715, 725, and 730 that follow are the same as in the cooperated dump obtaining processing 700 described in the first embodiment with reference to FIG. 7, and a description thereof is omitted to avoid duplication.

Next, the unified dump obtaining program 945 of the hardware management program-use area 940 refers to the hypervisor-use area transmission interface 1010 in the relevant column 640 of the obtaining area table 942 to determine which of the values "shared memory" and "output" is stored as the hypervisor-use area transmission interface 1010 (Step 1120). The unified dump obtaining program 945 outputs data in the hypervisor-use area 950 via the shared memory area 960 when the value of the hypervisor-use area transmission interface 1010 is "shared memory", and outputs the data via the output interface 170b, which is managed by the hypervisor program 137, when the value of the hypervisor-use area transmission interface 1010 is "output".

When determining in Step 1120 that data in the hypervisor-use area 950 is to be output via the shared memory area 960, the unified dump obtaining program 945 instructs the dump obtaining program 953 of the hypervisor-use area 950 to write, in the shared memory area 960, data in an area out of the state management data 951 in the hypervisor-use area 950 that corresponds to the data structure 620 obtained in Step 730 (Step 1125).

The unified dump obtaining program 945 receives, from the dump obtaining program 953, via the shared memory area 960, the data in the area that corresponds to the data structure 620 obtained in Step 730 (Step 1130).

The unified dump obtaining program 945 next transfers the data written in the shared memory area 960 to the external apparatus 180b via the output interface 170b (Step 1135). Through this step, only data in an area within the hypervisor-use area 950 that is identified as the cause of a failure is copied from the computer 910 to the external apparatus 180b.

It is not necessary to output the entirety of the data structure 620 in the hypervisor-use area 950 that is to be copied in one round of execution of Steps 1125 to 1135; the data structure 620 may be broken into a size that can be transferred/received at once via the shared memory area so that the data structure 620 to be copied is transferred fully by repeating Steps 1125 to 1135 a plurality of times.

When determining in Step 1120 that data in the hypervisor-use area 950 is to be output via the output interface 170b, the unified dump obtaining program 945 instructs the dump obtaining program 953 of the hypervisor-use area 950 to transfer, directly to the external apparatus 180b, with the use of the output interface 170b, data in an area out of the state management data 951 in the hypervisor-use area 950 that corresponds to the data structure 620 obtained in Step 730 (Step 1140).

Thereafter, the unified dump obtaining program 945 stands by until the dump obtaining program 953 finishes transferring the data structure 620 to the external apparatus 180b (Step 1145). When a notification about the completion of transmission of the data structure 620 is received from the dump obtaining program 953, the unified dump obtaining program 945 proceeds to Step 1150.

After finishing Step 1135 or 1145, the unified dump obtaining program 945 refers to the data placement information 944 to identify, as data to be copied, data in an area out of the state management data 943 of the hardware management program-use area 940 that corresponds to the data structure 620 obtained in Step 730. The unified dump obtaining program 945 transfers the data in the area to be copied and the data placement information 944 to the external apparatus 180b via the output interface 170b (Step 1150).

Through the processing described above, the unified dump obtaining program 945 suspends as needed a computer where a failure has occurred and a computer that is relevant to the failure considering the cause of the failure. The unified dump obtaining program 945 extracts from the obtaining area table 942 a data structure to be obtained based on the failure cause and priority, and transfers a copy of the data structure to the external apparatus 180b on a given path.

Figure 12:
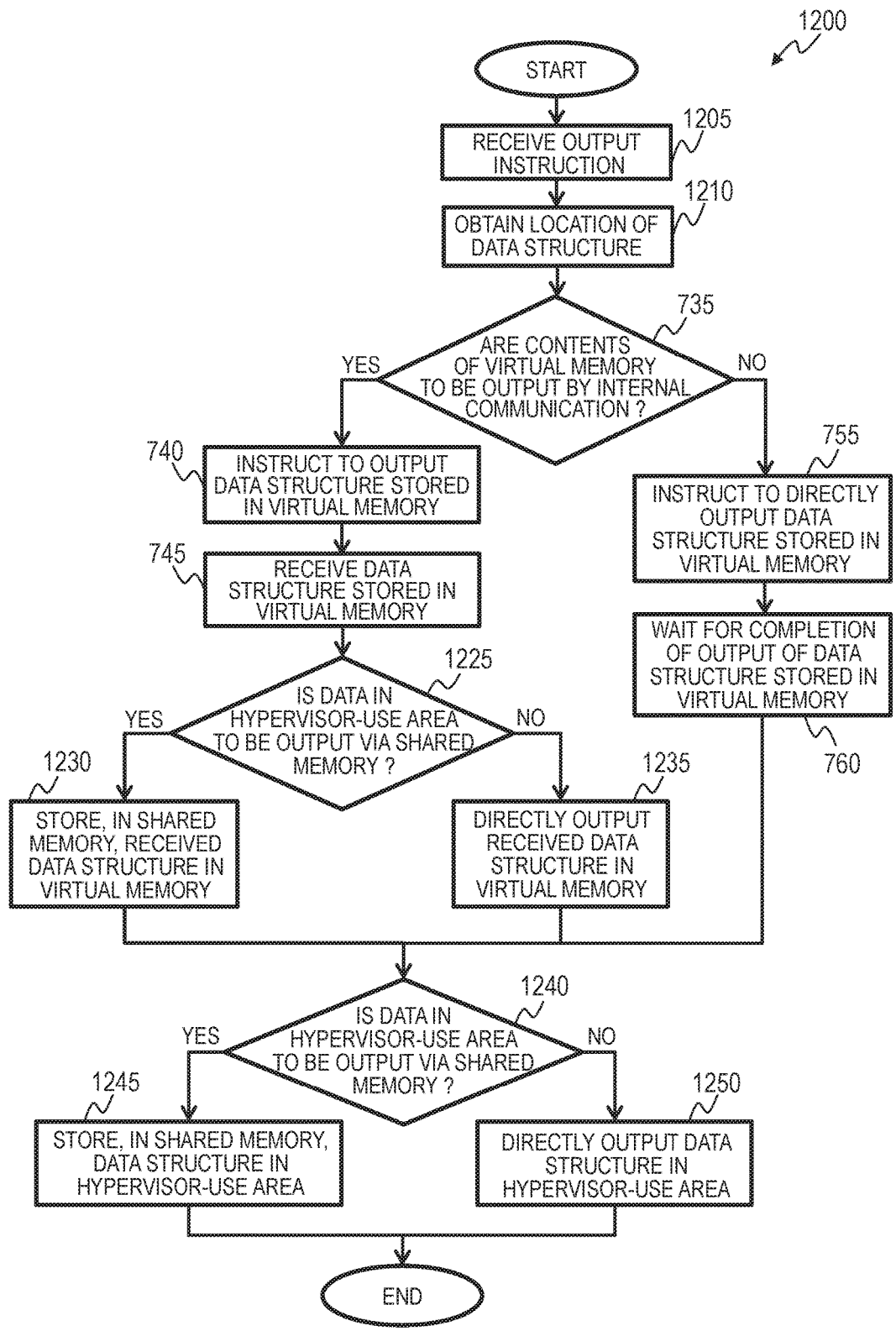
FIG. 12 is a flow chart illustrating an example of hypervisor-use area memory dump obtaining processing according to the second embodiment of this invention.

FIG. 12 is a flow chart illustrating an example of hypervisor-use area memory dump obtaining processing 1200. The execution of the hypervisor-use area memory dump obtaining processing 1200 is started by the dump obtaining program 953 when the unified dump obtaining program 945 instructs the dump obtaining program 953 to output the data structure 620 in Step 1125 or 1140 of the cooperated dump obtaining processing 1100.

At the start of the execution of the processing 1200, the unified dump obtaining program 945 notifies to the dump obtaining program 953 the data structure 620 to be obtained and information indicating which interface is to be used for dump transmission (Step 1205).

The dump obtaining program 953 refers to the data placement information 952 to identify, within the state management data 951, the location in the hypervisor-use area 950 of the data structure 620 to be obtained which has been notified in Step 1205 (Step 1210).

The dump obtaining program 953 next determines, from the interface information notified in Step 1205, as in the first embodiment, which of the internal communication interface 380 and the output interface 370 is to be used to output a memory dump of the relevant virtual memory 160 (virtual machine mapped area 131) (Step 735).

When it is determined in Step 735 that the contents of the virtual memory 160 are to be output via the internal communication interface 380, the dump obtaining program 953 instructs the dump obtaining program 163 of each relevant virtual machine 150 to transfer, to the dump obtaining program 953, via the internal communication interface 380, data in an area out of the state management data 162 in the virtual memory 160 that corresponds to the data structure 620 whose location has been identified in Step 1210, as in the first embodiment (Step 740).

The dump obtaining program 953 receives, from the dump obtaining program 163 of the virtual machine 150, via the internal communication interface 380, the data in the area that corresponds to the data structure 620 whose location has been obtained in Step 1210 (Step 745).

The dump obtaining program 953 next refers to the obtaining area table 942 of FIG. 10 to determine which component is indicated by the hypervisor-use area transmission interface 1010 as a component to be used for output (Step 1225). In the case where the hypervisor-use area transmission interface 1010 indicates the shared memory area 960 as a component to be used for output, the dump obtaining program 953 stores in the shared memory area 960 the data received in Step 745, and transfers a copy completion notification to the unified dump obtaining program 945 (Step 1230).

In the case where the hypervisor-use area transmission interface 1010 indicates the output interface 170b as a component to be used for output, the dump obtaining program 953 transfers the data received in Step 745 to the external apparatus 180b via the output interface 170b (Step 1235).

When it is determined in Step 735 that the contents of the virtual memory 160 are to be output via the output interface 170b, on the other hand, the dump obtaining program 953 instructs the dump obtaining program 163 of each relevant virtual machine 150 to transfer the contents of the virtual memory 160 to the external apparatus 180b by the same procedures as those in Steps 755 and 760 of the first embodiment.

After finishing one of Steps 1230, 1235, and 760, the dump obtaining program 953 determines which component is indicated by the hypervisor-use area transmission interface 1010 as a component to be used for output as in Step 1225 described above (Step 1240).

When it is determined in Step 1240 that the hypervisor-use area transmission interface 1010 indicates the shared memory area 960 as a component to be used for output, the dump obtaining program 953 stores in the shared memory area 960 the data in the area that corresponds to the data structure 620 whose location has been obtained in Step 1210, and transfers a copy completion notification to the unified dump obtaining program 945 (Step 1245).

In the case where the hypervisor-use area transmission interface 1010 indicates the output interface 170b as a component to be used for output, the dump obtaining program 953 transfers, to the external apparatus 180b, via the output interface 170b, the data in the area that corresponds to the data structure 620 whose location has been obtained in Step 1210 (Step S1250).

The cooperated dump obtaining processing 1100, hypervisor-use area memory dump obtaining processing 1200, and virtual memory dump obtaining processing 800 described above enable the computer 910 having detected a failure to transfer to the external apparatus 180b only the data structure 620 that is determined as relevant to the cause of the failure based on information in the obtaining area table 942, out of the state management data 943 and 951 of the computer 910 and the state management data 162 of the virtual machines 150, even in a configuration where computer resources of the computer 910 are divided between and managed separately by the hardware management program 941 and the hypervisor program 137.

The cooperated dump obtaining processing 1100 which prevents the transmission of the data structure 620 that is not used for failure analysis to the external apparatus 180b reduces the time required to transfer the data structure 620 for which memory dumping is executed and the storage area of the relevant external apparatus 180 in size.

As described above, when a failure occurs in the second embodiment, the unified dump obtaining program 945 of the hardware management program-use area 940 obtains a priority level and selects the data structure 620 that reaches the priority level or higher as a target of memory dumping. The unified dump obtaining program 945 is capable of identifying an area relevant to a failure and copying data in the identified area to the external apparatus 180b as a memory dump with respect to data in the hardware management program-use area 940 in addition to data in the hypervisor 120 and in the virtual machines 150.

Memory dumping of data structures that are not directly relevant to a failure can therefore be avoided by setting the priority level to a given value (for example, "B") or higher and thus limiting memory dump targets to data structures that are closely relevant to the cause of a failure.

Third Embodiment

Figure 13:
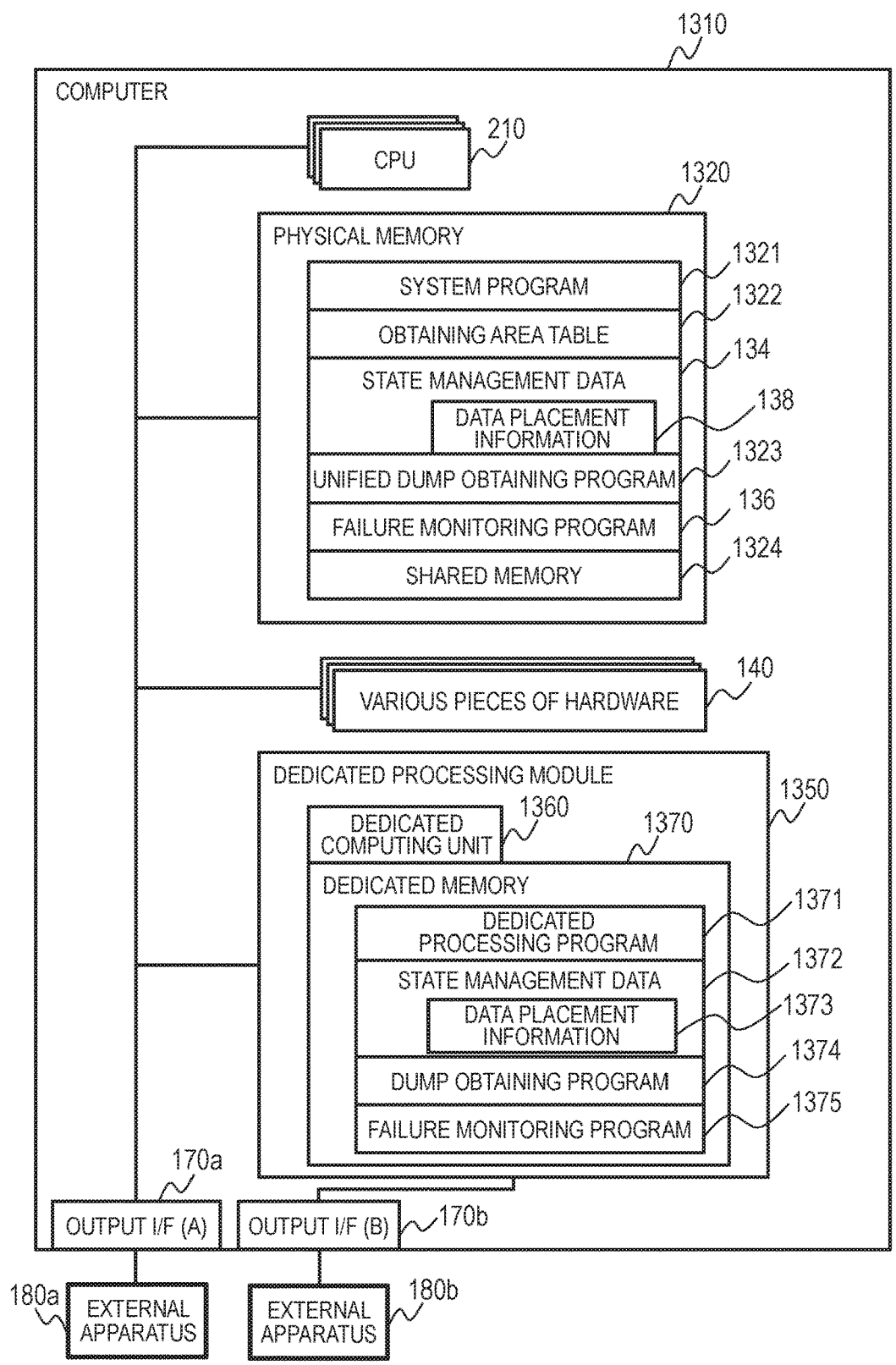
FIG. 13 is a block diagram illustrating an example of a computer which forms the computer system according to a third embodiment of this invention.

FIG. 13 is a block diagram illustrating an example of a computer 1310 which forms the computer system 100 according to a third embodiment of this invention. In the third embodiment, a dedicated processing module 1350 of hardware replaces the hardware management program-use area 940 of the second embodiment.

The computer 1310 includes at least one CPU 210, a physical memory 1320, the output interfaces 170a and 170b, the external apparatus 180a and 180b, the various pieces of hardware 140, and the dedicated processing module 1350.

The physical memory 1320 stores a system program 1321, an obtaining area table 1322, the state management data 134, the data placement information 138, a unified dump obtaining program 1323, the failure monitoring program 136, and a shared memory 1324.

The system program 1321 is a program for managing the components of the computer 1310. The system program 1321 may be the hypervisor program 137 as in the first embodiment and the second embodiment.

The obtaining area table 1322 holds an association relation between the type of an expected failure and a data structure in the state management data 134 or in state management data 1372 that is obtained in response to the failure.

The unified dump obtaining program 1323 is a program for copying, to the external apparatus 180a, via the output interface 170a, data that is in the physical memory 1320 and data that is in a dedicated memory 1370 at the time of a failure. The shared memory 1324 is a memory area in which both the computer 1310 and the dedicated processing module 1350 can read and write data.

The dedicated processing module 1350 is a processing module that handles some of processing procedures that are executed by the computer 1310. For example, the dedicated processing module 1350 is configured specially for processing that is long in processing time or large in power consumption when executed by the CPU 210, thereby cutting the processing time short or reducing power consumption.

The dedicated processing module 1350 can be implemented by, for example, an application-specific integrated circuit (ASIC) or a field-programmable gate array (FPGA), or a CPU that differs from the CPU 210 in processing performance and power characteristics.

The dedicated processing module 1350 includes a dedicated computing unit 1360 and the dedicated memory 1370. The dedicated processing module 1350 is coupled to the external apparatus 180b via the output interface 170b. The dedicated computing unit 1360 controls the dedicated processing module 1350 by reading programs and tables that are stored in the dedicated memory 1370.

The dedicated memory 1370 stores a dedicated processing program 1371, the state management data 1372, data placement information 1373, a dump obtaining program 1374, and a failure monitoring program 1375.

The dedicated processing program 1371 controls the external apparatus 180b via the output interface 170b.

The state management data 1372, the data placement information 1373, and the failure monitoring program 1375 are the same as the state management data 134, the data placement information 138, and the failure monitoring program 136, respectively, in the computer 110 described in the first embodiment, except that data of the state management data 1372 and the data placement information 1373 is about the dedicated processing module 1350, and that the monitoring target of the failure monitoring program 1375 is the dedicated processing module 1350.

The dump obtaining program 1374 is a program that receives from the unified dump obtaining program 1323 an instruction to obtain a memory dump when a failure occurs, and then transfers the contents of the dedicated memory 1370 at the time of the failure to the external apparatus 180a via the shared memory 1324 or the output interface 170a.

FIG. 14 shows an example of the obtaining area table 1322. The obtaining area table 1322 is created by replacing, with a dedicated memory transmission interface 1410, the virtual memory transmission interface 680 in the obtaining area table 132 which has been described in the first embodiment with reference to FIG. 6.

The ID 610 in the obtaining area table 1322 can have a value "physical memory" or "dedicated memory", depending on which memory area is to be indicated by the row 650 in question. The values "physical memory" and "dedicated memory" correspond to the physical memory 1320 and the dedicated memory 1370, respectively.

The dedicated memory transmission interface 1410 indicates which interface is to be used to copy data in the dedicated memory 1370 to the external apparatus 180a when a failure associated with the column 640 in question occurs.

Figure 15:
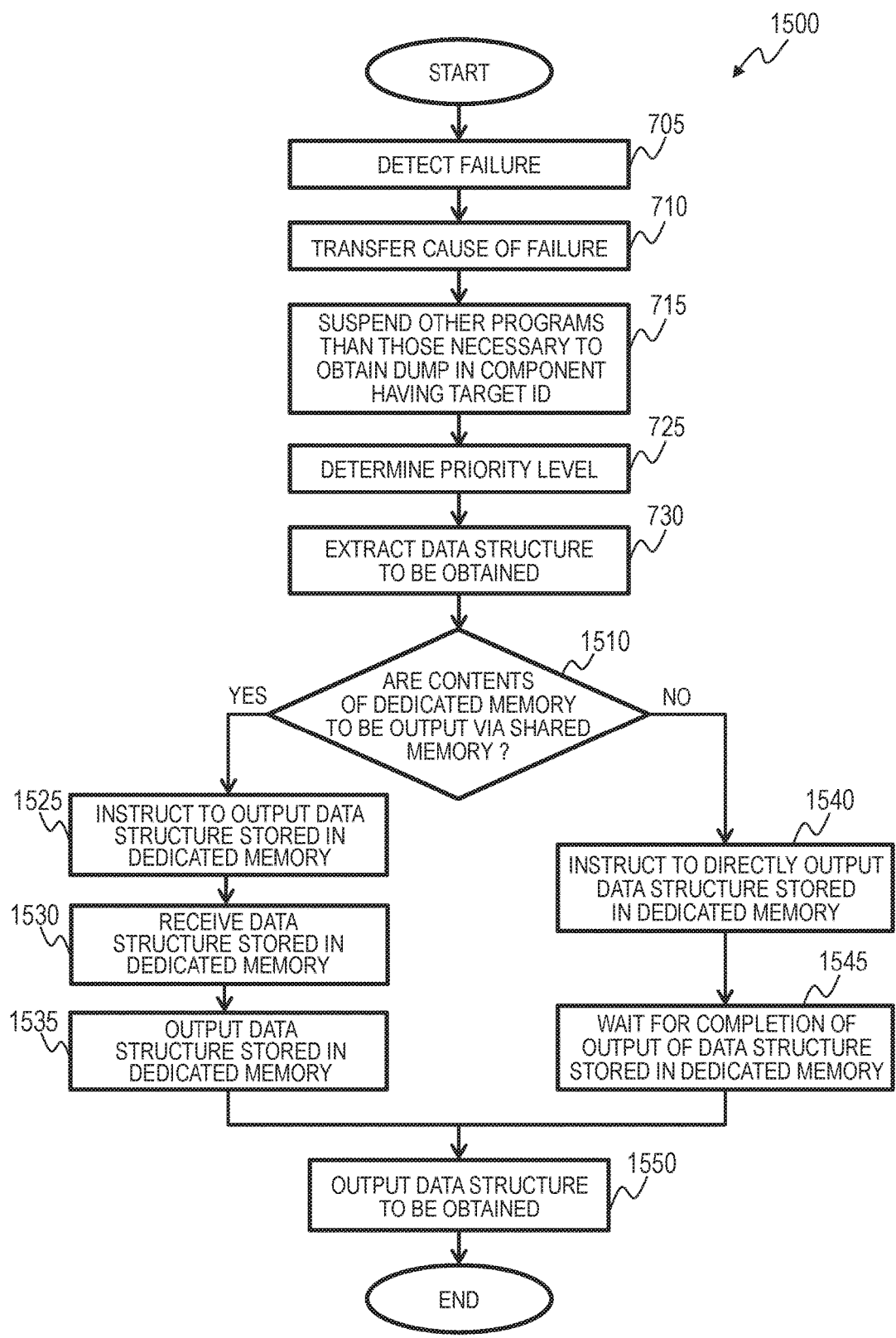
FIG. 15 is a flow chart illustrating an example of cooperated dump obtaining processing which is executed by the unified dump obtaining program of the physical memory according to the third embodiment of this invention.

FIG. 15 is a flow chart illustrating an example of cooperated dump obtaining processing 1500 which is executed by the unified dump obtaining program 1323 of the physical memory 1320.

The cooperated dump obtaining processing 1500 is started with a failure detection notification from the failure monitoring program 136 of the computer 1310, or the failure monitoring program 1375 of the dedicated processing module 1350 as a trigger (Step 705).

Steps 710, 715, 725, and 730 that follow are the same as in the cooperated dump obtaining processing 700 described in the first embodiment with reference to FIG. 7, and a description thereof is omitted to avoid duplication.

The unified dump obtaining program 1323 next refers to the dedicated memory transmission interface 1410 in the relevant column 640 of the obtaining area table 942 of FIG. 14 to determine which of the values "shared memory" and "output" is stored as the dedicated memory transmission interface 1410 (Step 1510).

When the dedicated memory transmission interface 1410 is "shared memory", the dedicated processing module 1350 outputs the contents of the dedicated memory 1370 to the shared memory 1324. When the dedicated memory transmission interface 1410 is "output", the dedicated processing module 1350 outputs the contents of the dedicated memory to the external apparatus 180a via the output interface 170a.

When it is determined in Step 1510 that the contents of the dedicated memory 1370 are to be output via the shared memory 1324, the unified dump obtaining program 1323 instructs the dump obtaining program 1374 of the dedicated processing module 1350 to write, to the shared memory 1324, data in an area out of the state management data 1372 in the dedicated memory 1370 that corresponds to the data structure 620 obtained in Step 730 (Step 1525).

The unified dump obtaining program 1323 receives, from the dump obtaining program 1374 via the shared memory 1324, the data in the area that corresponds to the data structure 620 obtained in Step 730 (Step 1530).

The unified dump obtaining program 1323 transfers the data written in the shared memory area 960 to the external apparatus 180a via the output interface 170a (Step 1535). Through this step, only data in an area within the dedicated processing module 1350 that is identified as the cause of a failure is copied from the computer 1310 to the external apparatus 180b.

It is not necessary to output the entirety of the data structure 620 in the dedicated memory 1370 that is to be copied in one round of execution of Steps 1525 to 1535; the data structure 620 may be broken into a size that can be transferred/received at once via the shared memory area 1324 so that the data structure 620 to be copied is transferred fully by repeating Steps 1525 to 1535 a plurality of times.

When determining in Step 1510 that data in the dedicated memory 1370 is to be directly output from the output interface 170a, the unified dump obtaining program 1323 instructs the dump obtaining program 1374 of the dedicated processing module 1350 to transfer, directly to the external apparatus 180a, with the use of the output interface 170a, data in an area out of the state management data 1372 in the dedicated memory 1370 that corresponds to the data structure 620 obtained in Step 730 (Step 1540).

Thereafter, the unified dump obtaining program 1323 stands by until the dump obtaining program 1374 finishes transferring the data structure 620 fully to the external apparatus 180a (Step 1545). When a notification about the completion of transmission of the data structure 620 is received from the dump obtaining program 1374, the unified dump obtaining program 1323 proceeds to Step 1550.

After finishing Step 1535 or 1545, the unified dump obtaining program 1323 refers to the data placement information 138 to identify, as data to be copied, data in an area out of the state management data 134 of the physical memory 1320 that corresponds to the data structure 620 obtained in Step 730. The unified dump obtaining program 1323 transfers the data in the area to be copied and the data placement information 138 to the external apparatus 180a via the output interface 170a (Step 1550).

Through the processing described above, the unified dump obtaining program 1323 suspends as needed a computer where a failure has occurred and an apparatus that is relevant to the failure considering the cause of the failure. The unified dump obtaining program 1323 extracts from the obtaining area table 1322 a data structure to be obtained based on the failure cause and priority, and transfers a copy of the data structure to the external apparatus 180a on a given path.

Figure 16:
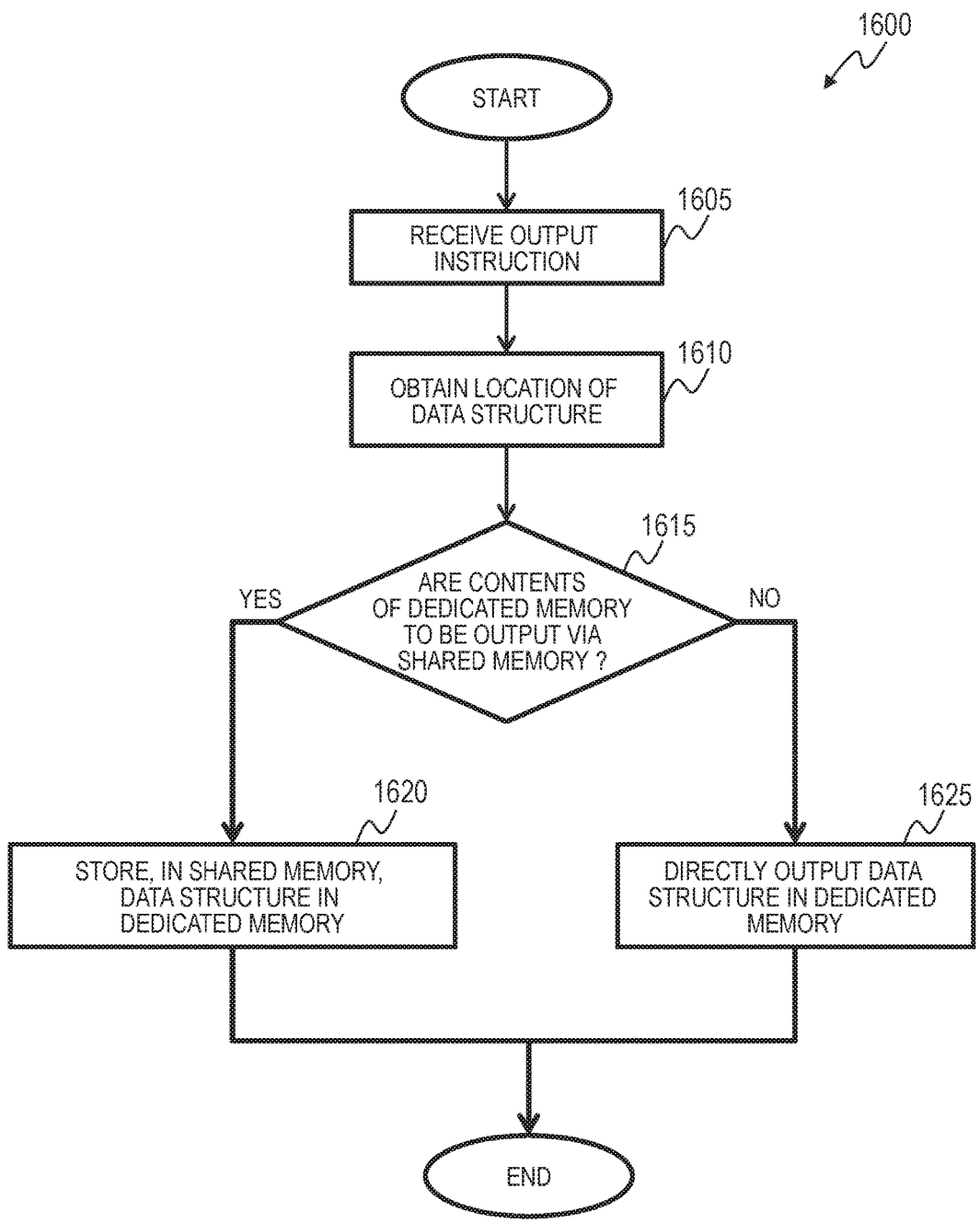
FIG. 16 is a flow chart illustrating an example of dedicated memory dump obtaining processing which is executed by the dump obtaining program of the dedicated processing module according to the third embodiment of this invention.

FIG. 16 is a flow chart illustrating an example of dedicated memory dump obtaining processing 1600 which is executed by the dump obtaining program 1374 of the dedicated processing module 1350. The execution of the dedicated memory dump obtaining processing 1600 is started by the dump obtaining program 1374 when the unified dump obtaining program 1323 instructs the dump obtaining program 1374 to output the data structure 620 in Step 1525 or 1540 of the cooperated dump obtaining processing 1500.

At the start of the execution of the processing 1600, the unified dump obtaining program 1323 notifies to the dump obtaining program 1374 the data structure 620 to be obtained and information indicating which interface is to be used for dump transmission (Step 1605).

The dump obtaining program 1374 refers to the data placement information 1373 to identify, within the state management data 1372, the location in the dedicated memory 1370 of the data structure 620 to be obtained which has been notified in Step 1605 (Step 1610).

The dump obtaining program 1374 determines, from the interface information notified in Step 1605, which of the shared memory 1324 and the output interface 170 is to be used for output (Step 1615).

When it is determined in Step 1615 that the shared memory 1324 is to be used for output, the dump obtaining program 1374 writes in the shared memory 1324 the data structure 620 whose location has been identified in Step 1610, and then notifies the unified dump obtaining program 1323 (Step 1620).

When it is determined in Step 1615 that the output interface 170 is to be used for output, the dump obtaining program 1374 transfers, to the external apparatus 180a, via the output interface 170a, the data structure 620 whose location has been obtained in Step 1610 (Step S1625).

In the case where the unified dump obtaining program 1323 notifies in Step 1605 a plurality of data structures 620 to be obtained, the dump obtaining program 1374 may execute Steps 1610 to 1625 for the plurality of data structures 620 at once, or may repeat Steps 1610 to 1625 for each of the plurality of data structures 620, or may process the plurality of data structures 620 in parallel in Steps 1610 to 1625.

The cooperated dump obtaining processing 1500 and dedicated memory dump obtaining processing 1600 described above enable the computer 1310 having detected a failure to transfer to the external apparatus 180a only the data structure 620 that is determined as relevant to the cause of the failure based on information in the obtaining area table 1322, out of the state management data 134 of the computer 1310 and the state management data 1372 of the dedicated processing module 1350, even in a configuration where the computer 1310 includes the dedicated processing module 1350 and the dedicated memory 1370.

The cooperated dump obtaining processing 1500 which prevents the transmission of the data structure 620 that is not used for failure analysis to the external apparatus 180a reduces the time required to transfer the data structure 620 and the storage area of the relevant external apparatus 180 in size.

As described above, when a failure occurs in the third embodiment, the unified dump obtaining program 1323 of the physical memory 1320 obtains a priority level and selects the data structure 620 that reaches the priority level or higher as a target of memory dumping. The unified dump obtaining program 1323 is capable of identifying an area relevant to a failure and copying data in the identified area to the external apparatus 180a as a memory dump with respect to data in the dedicated processing module 1350 in addition to data in the physical memory 1320.

Memory dumping of data structures that are not directly relevant to a failure can therefore be avoided by setting the priority level to a given value (for example, "B") or higher and thus limiting memory dump targets to data structures that are closely relevant to the cause of a failure.

This invention is not limited to the embodiments described above, and encompasses various modification examples. For instance, the embodiments are described in detail for easier understanding of this invention, and this invention is not limited to modes that have all of the described components. Some components of one embodiment can be replaced with components of another embodiment, and components of one embodiment may be added to components of another embodiment. In each embodiment, other components may be added to, deleted from, or replace some components of the embodiment, and the addition, deletion, and the replacement may be applied alone or in combination.

Some of all of the components, functions, processing units, and processing means described above may be implemented by hardware by, for example, designing the components, the functions, and the like as an integrated circuit. The components, functions, and the like described above may also be implemented by software by a processor interpreting and executing programs that implement their respective functions. Programs, tables, files, and other types of information for implementing the functions can be put in a memory, in a storage apparatus such as a hard disk, or a solid state drive (SSD), or on a recording medium such as an IC card, an SD card, or a DVD.

The control lines and information lines described are lines that are deemed necessary for the description of this invention, and not all of control lines and information lines of a product are mentioned. In actuality, it can be considered that almost all components are coupled to one another.

What is claimed is:

1. A computer system, comprising:
a physical computer, which comprises a processor and a memory; and
an external apparatus, which is coupled to the physical computer and which comprises a storage apparatus,
wherein the physical computer further comprises:
a virtualization module for providing at least one virtual machine;
a first failure monitoring module for detecting a failure in the physical computer and the virtualization module;
a first memory dump module for copying, to the external apparatus, a first area in the memory which is allocated to the virtualization module;
a second failure monitoring module for detecting a failure in the virtual machine; and
a second memory dump module for copying, to the external apparatus, a second area in the memory which is allocated by the virtualization module to the virtual machine,
wherein the virtualization module holds:
obtaining area information in which a data structure for which memory dumping is to be executed is set for each cause of a failure expected to occur in the physical computer, the virtualization module, and the virtual machine; and
first state management information for identifying a location in the first area of the data structure,
wherein the virtual machine holds second state management information for identifying a location in the second area of the data structure,
wherein, when a failure is detected by at least one of the first failure monitoring module or the second failure monitoring module, the first memory dump module obtains a cause of the failure from one of the first failure monitoring module and the second failure monitoring module that has detected the failure, refers to the obtaining area information to obtain a data structure that is associated with the obtained failure cause, refers to the first state management information to identify the first area that corresponds to the obtained data structure, copies the identified first area to the external apparatus, and notifies the obtained data structure to the second memory dump module, and
wherein the second memory dump module refers to the second state management information to identify the second area that corresponds to the notified data structure, and copies the identified second area to the external apparatus.

2. The computer system according to claim 1, wherein, in the obtaining area information, a priority level is set for each cause of a failure expected to occur in the physical computer, the virtualization module, and the virtual machine, and for each data structure for which memory dumping is executed.

3. The computer system according to claim 2, wherein the first memory dump module obtains a priority level as a threshold for obtaining the data structure, and obtains the data structure to which a priority level equal to or higher than the threshold is set.

4. The computer system according to claim 3, wherein the first memory dump module receives a priority level as the threshold, and uses the received priority level as the threshold.

5. The computer system according to claim 1,
wherein, in the obtaining area information, one of "suspension of all virtual machines running on the physical computer", "suspension of some virtual machines running on the physical computer", and "continued running of the virtual machines" is set for each failure cause as suspension targets, and
wherein the first memory dump module obtains from the obtaining area information the suspension targets that are set for the current failure cause, and controls the virtual machines based on the obtained suspension targets.

6. The computer system according to claim 1,
wherein each of the at least one virtual machine comprises:
　a first communication path for communication to and from the virtualization module; and
　a second communication path for communication to and from the external apparatus,
wherein, in the obtaining area information, path information for selecting one of the first communication path and the second communication path is set for each failure cause, and
wherein the second memory dump module outputs from one of the first communication path and the second communication path, based on the path information of the obtaining area information.

7. The computer system according to claim 1,
wherein the physical computer further comprises a hardware management module which runs by dividing resources of the physical computer,
wherein the hardware management module comprises:
　a third failure monitoring module for detecting a failure in the hardware management module; and
　a third memory dump module for copying to the external apparatus a third area in the memory which is allocated to the hardware management module,
wherein the hardware management module holds third state management information for identifying a location in the third area of the data structure,
wherein, when a failure is detected by at least one of the first failure monitoring module, the second failure monitoring module, or the third failure monitoring module, the first memory dump module obtains a cause of the failure from one of the first failure monitoring module, the second failure monitoring module, and the third failure monitoring module that has detected the failure, refers to the obtaining area information to obtain a data structure that is associated with the obtained failure cause, refers to the first state management information to identify the first area that corresponds to the obtained data structure, copies the identified first area to the external apparatus, and notifies the obtained data structure to the second memory dump module and the third memory dump module, and
wherein the third memory dump module refers to the third state management information to identify the third area that corresponds to the notified data structure, and copies the identified third area to the external apparatus.

8. A memory dump method for executing memory dumping in a computer system,
the computer system comprising:
　a physical computer, which comprises a processor and a memory; and
　an external apparatus, which is coupled to the physical computer and which comprises a storage apparatus,
the physical computer further comprising a virtualization module for providing at least one virtual machine,
the memory dump method comprising:

a first step of detecting, by the virtualization module, a failure in the physical computer and the virtualization module;
　a second step of detecting, by the virtual machine, a failure in the virtual machine;
　a third step of obtaining, by the virtualization module, when a failure is detected in at least one of the physical computer, the virtualization module, or the virtual machine, a cause of the failure;
　a fourth step of obtaining, by the virtualization module, a data structure that is associated with the obtained failure cause by referring to obtaining area information in which a data structure for which memory dumping is to be executed is set for each cause of a failure;
　a fifth step of referring, by the virtualization module, to first state management information for identifying a location of the data structure in a first area, which is an area in the memory that is allocated to the virtualization module, in order to identify a location in the first area that corresponds to the data structure, and copying data that is at the identified location in the first area to the external apparatus;
　a sixth step of notifying, by the virtualization module, the data structure to the virtual machine;
　a seventh step of referring, by the virtual machine, to second state management information for identifying a location of the data structure in a second area, which is an area in the memory that is allocated by the virtualization module to the virtual machine, and identifying a location in the second area that corresponds to the notified data structure; and
　an eighth step of copying, by the virtual machine, data that is at the identified location in the second area to the external apparatus.

9. The memory dump method according to claim 8,
wherein, in the obtaining area information, a priority level is set for each cause of a failure expected to occur in the physical computer, the virtualization module, and the virtual machine, and for each data structure for which memory dumping is executed.

10. The memory dump method according to claim 9,
wherein the fourth step comprises obtaining a priority level as a threshold for obtaining the data structure, and obtaining the data structure to which a priority level equal to or higher than the threshold is set.

11. The memory dump method according to claim 10,
wherein the fourth step comprises receiving a priority level as the threshold, and using the received priority level as the threshold.

12. The memory dump method according to claim 8,
wherein, in the obtaining area information, one of "suspension of all virtual machines running on the physical computer", "suspension of some virtual machines running on the physical computer", and "continued running of the virtual machines" is set for each failure cause as suspension targets, and
wherein the fourth step comprises obtaining from the obtaining area information the suspension targets that are set for the current failure cause, and controlling the virtual machines based on the obtained suspension targets.

13. The memory dump method according to claim 8,
wherein each of the at least one virtual machine comprises:
　a first communication path for communication to and from the virtualization module; and a second communication path for communication to and from the external apparatus, wherein, in the obtaining area information, path information for selecting one of the first communication path and the second communication path is set for each failure cause, and wherein the eighth step comprises outputting from one of the first communication path and the second communication path, based on the path information of the obtaining area information.

14. The memory dump method according to claim 8, wherein the physical computer further comprises a hardware management module which runs by dividing resources of the physical computer, wherein the first step comprises:
  detecting, by the virtualization module, a failure in the physical computer and the virtualization module; and
  detecting, by the hardware management module, a failure in the hardware management module, wherein the third step comprises obtaining, by the virtualization module, when a failure is detected in one of the physical computer, the virtualization module, the virtual machine, and the hardware management module, a cause of the failure, wherein the sixth step comprises notifying, by the virtualization module, the data structure to the virtual machine and the hardware management module each, and wherein the memory dump method further comprises:
  a ninth step of referring, by the hardware management module, to third state management information for identifying a location of the data structure in a third area, which is an area in the memory that is allocated to the hardware management module, and identifying a location in the third area that corresponds to the notified data structure; and
  a tenth step of copying, by the hardware management module, data that is at the identified location in the third area to the external apparatus.

15. A computer system, comprising:

a physical computer, which comprises a processor, a first memory, and a dedicated processing module; and an external apparatus, which is coupled to the physical computer and which comprises a storage apparatus, wherein the physical computer further comprises:
  a system control module for controlling the physical computer;
  a first failure monitoring module for detecting a failure in the physical computer and the virtualization module;
  a first memory dump module for copying, to the external apparatus, an area in the first memory which is allocated to the system control module, wherein the dedicated processing module comprises:
  a second failure monitoring module for detecting a failure in the dedicated processing module; and
  a second memory dump module for copying, to the external apparatus, an area in a second memory which is included in the dedicated processing module, wherein the system control module holds:
  obtaining area information in which a data structure for which memory dumping is to be executed is set for each cause of a failure expected to occur in the physical computer, the system control module, and a hardware management module; and
  first state management information for identifying a location in the first memory of the data structure, wherein the hardware management module holds second state management information for identifying a location in the second memory of the data structure, wherein, when a failure is detected by at least one of the first failure monitoring module or the second failure monitoring module, the first memory dump module obtains a cause of the failure from one of the first failure monitoring module and the second failure monitoring module that has detected the failure, refers to the obtaining area information to obtain a data structure that is associated with the obtained failure cause, refers to the first state management information by using the obtained data structure as a key to identify an area of the first memory that corresponds to the obtained data structure, copies the identified area of the first memory to the external apparatus, and notifies the obtained data structure to the second memory dump module, and wherein the second memory dump module refers to the second state management information by using the notified data structure as a key to identify an area of the second memory, and copies the identified second area to the external apparatus.

* * * * *